US012531336B2

(12) United States Patent
Caratelli et al.

(10) Patent No.: US 12,531,336 B2
(45) Date of Patent: Jan. 20, 2026

(54) ANTENNA SYSTEM FOR ANTENNA BEAMFORMING

(71) Applicant: THE ANTENNA COMPANY INTERNATIONAL N.V., Willemstad (CW)

(72) Inventors: Diego Caratelli, Eersel (NL); Stanislav Ogurtsov, Eindhoven (NL)

(73) Assignee: THE ANTENNA COMPANY INTERNATIONAL N.V., Willemstad (CW)

( * ) Notice: Subject to any disclaimer, the term of this patent is extended or adjusted under 35 U.S.C. 154(b) by 333 days.

(21) Appl. No.: 18/034,614

(22) PCT Filed: Oct. 29, 2021

(86) PCT No.: PCT/NL2021/050662
§ 371 (c)(1),
(2) Date: Apr. 28, 2023

(87) PCT Pub. No.: WO2022/093026
PCT Pub. Date: May 5, 2022

(65) Prior Publication Data

US 2023/0402749 A1 Dec. 14, 2023

(30) Foreign Application Priority Data

Oct. 29, 2020 (NL) .................................... 2026793

(51) Int. Cl.
*H01Q 3/36* (2006.01)
*H01Q 1/24* (2006.01)
*H01Q 21/29* (2006.01)

(52) U.S. Cl.
CPC ............... *H01Q 3/36* (2013.01); *H01Q 1/246* (2013.01); *H01Q 21/293* (2013.01)

(58) Field of Classification Search
CPC ......... H01Q 3/36; H01Q 1/246; H01Q 21/293
See application file for complete search history.

(56) References Cited

U.S. PATENT DOCUMENTS

| | | | | |
|---|---|---|---|---|
| 6,178,333 | B1 * | 1/2001 | Feuerstein | H01Q 21/293 455/60 |
| 6,522,897 | B1 * | 2/2003 | Martek | H01Q 1/246 455/562.1 |
| 10,505,609 | B2 * | 12/2019 | Zimmerman | H01Q 3/267 |
| 2013/0307752 | A1 | 11/2013 | Johansson et al. | |

(Continued)

OTHER PUBLICATIONS

Search Report dated Jul. 17, 2021 issued in corresponding Netherlands Application No. 2026793.

(Continued)

*Primary Examiner* — Hai V Tran
(74) *Attorney, Agent, or Firm* — Nath, Goldberg & Meyer; Joshua B. Goldberg

(57) ABSTRACT

The invention relates to an antenna system for antenna beamforming. The system comprises multiple antenna panels, wherein each panel has a rear side and a front side, wherein the front side of each panel comprises at least one phased antenna array (PAA), wherein each phased antenna array comprises at least one array of antenna elements, wherein the antenna panels are positioned such that the phased antenna arrays enable coverage at least along all angular directions of the azimuthal plane.

20 Claims, 17 Drawing Sheets

(56) References Cited

U.S. PATENT DOCUMENTS

Figure 1A:
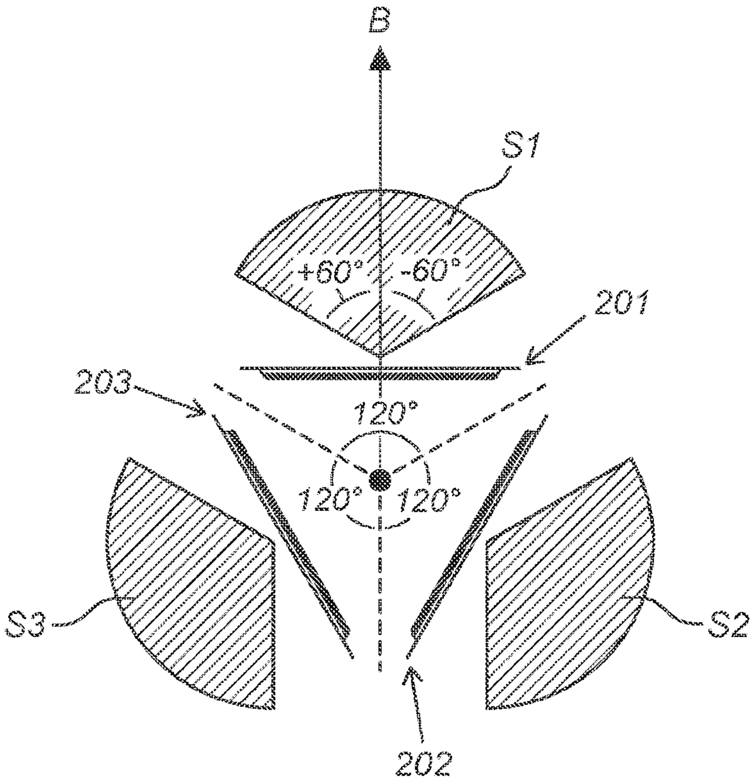

| | | | | |
|---|---|---|---|---|
| 2015/0288438 | A1 | 10/2015 | Maltsev et al. | |
| 2016/0285174 | A1 | 9/2016 | Chistyakov et al. | |
| 2017/0195018 | A1* | 7/2017 | Ma | H01Q 25/00 |
| 2018/0227775 | A1* | 8/2018 | Bisiules | H01Q 21/08 |
| 2019/0348761 | A1* | 11/2019 | Miehle | H01Q 3/28 |

OTHER PUBLICATIONS

Search Report dated Feb. 18, 2022 issued in corresponding International Application No. PCT/NL2021/050662.

Written Opinion of the International Searching Authority dated Feb. 18, 2022 issued in corresponding International Application No. PCT/NL2021/050662.

* cited by examiner

ANTENNA SYSTEM FOR ANTENNA BEAMFORMING

This is a National Phase Application filed under 35 U.S.C. 371 as a national stage of PCT/NL2021/050662, filed Oct. 29, 2021, an application claiming the benefit of Netherlands Application No. 2026793, filed Oct. 29, 2020, the content of each of which is hereby incorporated by reference in its entirety.

The invention relates to an antenna system for antenna beamforming. The invention also relates to a control unit for use in such antenna system. The invention further relates to a method for operating an antenna system for antenna beamforming.

The development of 5G and 6G wireless communication networks requires compact light-weight cost-efficient directive antennas with electronically scanned beams, referred as phased antenna arrays (PAAs), for base-stations, repeaters, and access points being capable of full-azimuth coverage. Full-azimuth coverage with PAAs can be achieved using two basic approaches: the first one relies on a conformal array architecture (e.g., along a ring) with only a certain array sector being activated at a time to synthesize a beam along the desired direction; the second approach is based on the use of multi-faceted PAAs. The latter is preferable in terms of weight and costs yet associated with higher scan losses.

The most efficient, in terms of weight and costs, is a multi-faceted PAA configuration which makes use of three array panels in an equilateral triangular arrangement, where each panel is able to scan the beam up to 60 degrees from the boresight, on each side, so to cover the azimuthal plane along 360 degrees. In such array configuration, however, the beam intensity would normally reduce progressively with the scan angle up to 3-to-5 dB as when moving away from the boresight. The boresight is the direction normal to the individual panel.

It is a first objective of the invention to provide an improved antenna system having an improved coverage in terms of radiation intensity and/or effective isotropic radiated power in the azimuthal plane.

It is a second objective of the invention to provide an improved antenna system by means of which scan losses can be compensated.

It is a third objective of the invention to provide an improved antenna system configured to operate in the millimetre wave frequency range of 24 to 52 GHz, in particular the millimetre wave frequency range of 24 to 29 GHz.

At least one of these objectives can be achieved by providing an antenna system according to the preamble, comprising: a plurality of phased antenna arrays, wherein each phased antenna array comprises at least one array of antenna elements, wherein the phased antenna arrays are positioned such that an coverage at least along all angular directions of the azimuthal plane can be realised; one or more beamforming networks, in particular radio frequency (RF) beamforming networks, wherein each phased antenna array is connectable or connected to at least one of said one or more beamforming networks to adjust phase shifts associated with the antenna elements of said phased antenna array to generate an electromagnetic radiation beam; and at least one control unit connectable or connected to said one or more beamforming networks, wherein the control unit is at least configured to control one or more beamforming networks to cause a primary phased array of an antenna panel to generate a primary radiation beam in a first direction and to simultaneously cause a secondary phased antenna array of an adjacent panel to generate a secondary radiation beam in a second direction, wherein preferably the first direction substantially equals the second direction such that a constructive superposition of the electromagnetic fields relevant to the primary and secondary beams is obtained. Typically, the antenna system comprises at least three antenna panels, wherein each panel has a rear side and a front side, wherein the front side of each panel comprises at least one phased antenna array (PAA). Typically, each PAA is embedded in an antenna panel. Here, the antenna panels are preferably positioned such that the phased antenna arrays enable omnidirectional coverage at least along the azimuthal plane and/or coverage along all angular directions of the azimuthal plane.

An important advantage of the antenna system according to the invention is that an improved azimuth coverage with PAAs can be achieved, and typically a full-azimuth coverage can be achieved. Conventional blind spots of the antenna system can be eliminated in this manner. The Effective Isotropic Radiated Power (EIRP) can be improved significantly by the antenna system according to the invention, in particular by steering the beams generated by PAAs of adjacent antenna panels in a direction of interest so to superimpose the electromagnetic fields relevant to said beams along a desired direction or desired angular range (for example around the direction which coincides with the conventional blind spots), such that a constructive superposition of the in-phase electromagnetic waves associated with said beams occurs at said direction or desired angular range. This may increase the EIRP up to 6 dB at the most critical scan angles with the previous state of the art beamforming and, thus, compensates for scan losses. A benefit of the antenna system according to the present invention is that the need for increasing the input power when a better signal is to be obtained can be omitted. Hence, the solution according to the invention wherein the first direction substantially equals the second direction results in a beneficial system when it comes to efficiency of power. The improvement applies for both the transmit and receive modes. The antenna system according to the invention can be designed in a compact, light-weight manner.

Preferably, the phased antenna arrays (PAAs) are configured to operate in the millimetre frequency band, in particular the 24 to 52 GHz range, more in particular the 24 to 29 GHz range. Optionally, side lobes of the phase antenna arrays can be constructively used (in an at least partially overlapping manner) to improve the EIRP in an intermediate zone defined by two said phased antenna arrays. The antenna system according to the invention is (therefore) preferably designed for 5G wireless communications at millimetre-wave frequencies, (and/or wherein the electromagnetic waves are formed by radio waves), but the antenna system according to the invention may also be used for other types of applications operable within the electromagnetic spectrum, such as e.g. radio frequency (RF), microwave, sub-millimetre-wave, Terahertz, nanoscale applications and/or other electromagnetic spectrum (EM) frequencies. Other solution can be found in the fields of sound and seismic, and in the field of ionizing radiation (UV, X, gamma). Furthermore, radar, satellite, photonic, and optical applications can be also tackled using the invention. In this case, the preamble “antenna system for antenna beamforming antenna system” may be replaced by “radar system”, “optical system”, “photonic system”, “satellite system”, or simply “beamforming system”, dependent on the specific application.

When it is indicated that a constructive superposition of the electromagnetic fields relevant to the primary and secondary beams is obtained, it can also be said that a constructive superposition of the electromagnetic fields of the primary and secondary beams is obtained, or that a constructive superposition of the electromagnetic fields associated with the primary and secondary beams is obtained, or that a constructive superposition of the electromagnetic fields relating to the primary and secondary beams is obtained.

Preferably, at least one control unit connectable or connected to said one or more beamforming networks, wherein the control unit is at least configured to control one or more beamforming networks to cause a primary phased array of an antenna panel to generate a primary radiation beam in a first direction and to simultaneously cause a secondary phased antenna array of an adjacent panel to generate a secondary radiation beam in the same direction.

Typically, the control unit is configured to steer the direction and/or the angular width of each panel beam. Steering the beam in a first direction or second direction (or other direction) means that the relevant main lobe is along said direction. Typically, the control unit and the beamforming network(s) are configured to point two beams associated with different PAAs in the same direction of interested, for example the first direction. Alternatively, the control unit and the beamforming network(s) can be configured to point two beams associated with different PAAs in a converging direction. Typically, the control unit and the beamforming network(s) are configured to generate two beams, in particular the main lobes, associated with different PAAs in phase to realize a desired constructive superposition or summation of said beams. Preferably, the control unit is configured to control one or more beamforming networks to cause each antenna element of at least one phased antenna array to generate electromagnetic waves mutually extending in substantially the same direction.

In a preferred embodiment, the control unit is configured to control one or more beamforming networks to cause a primary phased array of an antenna panel to generate a primary radiation beam in a first direction and to simultaneously cause a secondary phased antenna array of an adjacent panel to generate a secondary radiation beam in a second direction, wherein preferably the first direction substantially equals the second direction such that a constructive superposition of electromagnetic waves of the primary beam and the secondary beam is obtained, and such that the power of the secondary beam is gradually adjusted, in particular gradually increased. By gradually (continuously or discontinuously (step-like)) increasing the power of the secondary beam, the radio coverage can be enhanced. Directing the primary radiation beam in a first direction can for example be achieved by applying a directive or predetermined phase shift to the signal of each antenna element of the primary phased antenna array. Substantially simultaneously, a directive or predetermined phase shift of the signal of each antenna element of the secondary phased antenna array can be applied in order to direct the secondary radiation beam in the second direction, wherein preferably the second direction substantially equals the first direction.

The antenna panels (and PAAs) typically have a ring-shaped (annular) or multi-faceted arrangement, wherein a rear side of each antenna panel (and each PAA) faces a rear side of at least one other antenna panel (and at least one other PAA). This typically leads to a rosette of shaped radiation patterns of the antenna system according to the invention. Typically, adjacent antenna panels have a mutually common side edge, either real or virtual formed by extensions of the panels, wherein both the first direction of the primary beam generated by the primary phased antenna array and the second direction of the secondary beam generated by the secondary phased antenna array are directed towards said common side edge. This does not necessarily mean that each beam (direction) should intersect or coincide with the side edge, but rather that the beam (direction) is typically directed more in the direction of the side edge of a panel than to the normal of (the centre portion of) said panel. Preferably, at least one, and preferably all panels are aligned in a direction which is orthogonal to the azimuthal plane but, in general, form an angle smaller or larger than 90 degrees relative to the azimuthal plane.

The control unit is preferably configured to control one or more beamforming networks to cause a phased array of an antenna panel to generate a radiation beam in a moving direction (scanning direction) from one side of the antenna panel to an opposing side of the antenna panel. By means of using electronically scanning beams, coverage at least along all angular directions of the azimuthal plane is obtained, but possibly also in the elevation plane (vertical plane). Typically, the coverage at least along all angular directions of the azimuthal plane can be (virtually) divided into a plurality of sectors, wherein each sector consists of at least two sub-sectors associated with different PAAs. The sectors typically constitute the blind spots of a conventional antenna and/or the sectors contain directions of high scan losses of a conventional phased array antenna, but in the antenna system according to the invention, these sectors could be covered by constructive superposition of two beams generated by two PAAs. This will be explained in more detail in the patent drawings.

Preferably, the control unit is configured to control one or more beamforming networks to cause all antenna elements of a primary phased array of an antenna panel to generate a primary radiation beam in a first direction and to simultaneously cause all antenna elements of a secondary phased antenna array of an adjacent panel to generate a secondary radiation beam in a second direction, wherein the first direction equals the second direction such that a constructive superposition of the electromagnetic fields relevant to the primary and secondary beams is obtained. In case multiple arrays per antenna panel are applied, preferably all antenna elements of each phased antenna array are included in or contribute to the beam generation.

In order to allow the beams to interfere in phase with each other at a predetermined location or zone and/or in a predetermined direction (typically the first direction as defined above), it is preferred that the control unit is configured to control one or more beamforming networks to cause a primary phased array of an antenna panel to generate a primary radiation beam in a first direction and to simultaneously cause a secondary phased antenna array of an adjacent panel to generate a secondary radiation beam in a second direction, such that a constructive superposition of the electromagnetic fields associated with the primary beam and the secondary beam is obtained, based upon the mutual orientation of said antenna panels and the operating frequency of the phased antenna arrays. By predefining the mutual orientation and the operating frequency, the propagation path of the electromagnetic field associated with the primary beam can be calculated, based upon which a suitable time delay or phase shift can be determined by the control unit to ensure that the electromagnetic field associated with the secondary beam is in phase, so to achieve the desired constructive superposition of waves. Hence preferably, the control unit is configured to compute and/or measure a value of the phase shift between the primary beam and the secondary beam to realize a superposition of electromagnetic waves of the primary beam and the secondary beam. Possibly, the control unit is configured to control one or more beamforming networks to cause a first direction specific phase shift and/or a second direction specific phase shift of the antenna elements of at least one phased antenna array. A primary first direction specific phase shift may apply to all antenna elements of primary antenna array. In line with this, a secondary first direction specific phase shift may apply to all antenna elements of secondary antenna array. The phase shift value of the first direction specific phase shift typically depends on the location of the centre of the secondary phased antenna array relative to the centre of the primary phased antenna array as well as on the operating frequency. The value of the first direction specific phase shift can be determined as a phase difference between the wave signals radiated by the equivalent isotropic sources residing in the centres of the primary and secondary phased antenna arrays toward the specific direction of interest, wherein the equivalent source at the centre of the primary phased antenna array is seen as reference. If the determined value is negative the first direction specific phase shift applies to the antenna elements of the primary phased array. If the determined value is positive the first direction specific phase shift applies to the antenna elements of the secondary phased array. It is also conceivable that a second direction specific phase shift applies to all antenna elements of a primary and/or secondary antenna array. The second direction specific phase shift can be related to the far-field phase values of the signals radiated by the primary and the secondary phased antenna arrays in the direction of interest. For example, the direction of interest is towards the azimuth angle Ω measured clockwise for the primary phased antenna array from its own outward normal direction and the azimuth angle (360/number of phased antenna arrays) degrees−Ω measured counter-clockwise for the secondary phased antenna array from its own outward normal direction. The value of the second direction specific phase shift is determined as the far-field phase of primary phased antenna array toward the angular direction Ω measured clockwise from the relevant outward normal minus the far-field phase of the secondary phased antenna array toward the angular direction (360/number of phased antenna arrays) degrees−Ω measured counter-clockwise from the relevant outward normal. If the determined second direction specific phase shift value is positive, the phase shift applies to the antenna elements of the primary phased antenna array, and otherwise to the antenna elements of the secondary phased antenna array. Preferably, each phased antenna array (PAA) comprises at least one row, preferably at least two rows, of at least four antenna elements, wherein the polarization of each antenna element can be horizontal, or vertical, or slanted e.g. with an angle of −45 or +45 degrees.

Typically, the superposed electromagnetic waves relevant to the primary and secondary beams define a composite beam which extends in the first direction. Preferably, the first direction substantially equals the second direction. Hence, the primary beam and its first direction is typically dominant over the supportive secondary beam. Here, the primary PAA is considered as primary radiator, and the secondary PAA is considered as secondary radiator. Preferably, the superposed electromagnetic waves relevant to the primary and secondary beams define a composite beam, wherein the control unit is configured to steer the composite beam in different directions. Typically, each pair of adjacent panels defines a sector of high scan losses, wherein the conventional antenna coverage is typically poor or even absent, as a result of which it is desired to generate a composite beam within each of said sectors so to compensate for the high scan losses and improve, in this way, the coverage. As shown in the illustrative drawings and charts, the EIRP of a composite beam can be higher than the EIRP of a conventional main lobe associate with a PAA. Commonly, the control unit is configured to successively generate different composite beams, although it is also imaginable that different composite beams are generated simultaneously.

Preferably, the control unit is configured to control one or more beamforming networks to cause a phased array of an antenna panel to generate a boresight radiation beam in a direction perpendicular or normal to a plane defined by said antenna panel. This boresight beam is considered a main lobe associated with a PAA. The control unit is preferably configured to alternately generate at least one composite beam and at least one boresight beam.

In a preferred embodiment, the number of antenna panels is equal to N, wherein N is an integer larger than or equal to 3 or 4, wherein the angle enclosed by the normal vectors to adjacent antenna panels is 360/N degrees. In case N equals to 3, the antenna system comprises three panels and/or three phased antenna arrays which are preferably positioned in an equilateral triangular arrangement, wherein adjacent panels (or PAAs) mutually enclose an angle of 60 or 120 degrees. In case N equals to 4, the antenna system preferably comprises four panels and/or four phased antenna arrays which are preferably positioned in an equilateral square arrangement, wherein adjacent panels (or PAAs) mutually enclose a 90 degrees angle. It is also imaginable that N is larger than 4, for example 5, 6, 7, 8, 9 or 10, or even larger than 10. Preferably, a primary angle enclosed by the normal of (a front side of) an antenna panel and said first direction is equal to Ω degrees, and wherein a secondary angle enclosed by the normal of (a front side of) an adjacent panel and said first direction is equal to (360/N) degrees−Ω. Typically, said normal vectors intersect in a space surrounded by the antenna panels (and the PAAs).

Preferably, the control unit is configured to control one or more beamforming networks to cause the secondary phased array of an antenna panel to generate a secondary radiation beam in a second direction, wherein said second direction and a plane defined by said antenna panel mutually encloses an angle between 0 and degrees. Typically, such a small angle is favourable to realize sufficient overlap between the primary beam and the secondary beam.

In a preferred embodiment, the number of antenna panels is equal to N, wherein N is an integer larger than or equal to 3 or 4, wherein each antenna panel defines a plane, and wherein the angle enclosed by planes defined by adjacent panels is 360/N degrees. Preferably, adjacent antenna panels, in particular facing a mutually common side edge, are positioned at a distance from each other. Preferably, the smallest distance between two panels is smaller than 15 millimetres. The panels may be at least partially flat panels and/or may be at least partially curved panels. Each PAA may (also) be at least partially flat and/or at least partially curved. Preferably, the antenna panels are mounted on a supporting structure, such as a frame. Preferably, a plane defined by each phased antenna array is a vertical plane. As mentioned above, the antenna system is typically configured to generate beams collectively covering the full azimuthal plane.

Preferably, the antenna system is configured as base station, repeater, router, and/or access point. Alternatively or additionally, the antenna system according to the invention may also be used as radar system and/or as light source.

The invention also relates to a control unit for use in an antenna system according to the invention. Embodiments, possible operation modes, and advantages of this control unit have been described above in a comprehensive manner, and will described below in more detail.

The invention further relates to a method for operating an antenna system according to the invention, wherein the control unit is activated to control one or more beamforming networks to cause a primary phased array of an antenna panel to generate a primary radiation beam in a first direction and to simultaneously cause a secondary phased antenna array of an adjacent panel to generate a secondary radiation beam in a second direction, wherein preferably the first direction substantially equals the second direction such that a constructive superposition of the electromagnetic fields relevant to the primary and secondary beams is obtained.

The invention will be further elucidated by means of the following clauses.

1. Antenna system for antenna beamforming, comprising:
   at least three antenna panels, wherein each panel has a rear side and a front side, wherein the front side of each panel comprises at least one phased antenna array (PAA), wherein each phased antenna array comprises at least one array of antenna elements, wherein the antenna panels are positioned such that the phased antenna arrays enable omnidirectional coverage at least along the azimuthal plane;
   one or more beamforming networks, in particular radio frequency (RF) beamforming networks, wherein each phased antenna array is connectable or connected to at least one of said one or more beamforming networks to adjust phase shifts associated with the antenna elements of said phased antenna array to generate an electromagnetic radiation beam; and
   at least one control unit connectable or connected to said one or more beamforming networks, wherein the control unit is at least configured to control one or more beamforming networks to cause a primary phased array of an antenna panel to generate a primary radiation beam in a first direction and to simultaneously cause a secondary phased antenna array of an adjacent panel to generate a secondary radiation beam in a second direction, such that a constructive superposition of the electromagnetic fields relevant to the primary and secondary beams is obtained.
2. Antenna system according to clause 1, wherein the control unit is configured to steer the direction of each panel array radiation beam.
3. Antenna system according to clause 1 or 2, wherein the control unit is configured to steer the beam width of each panel array radiation beam.
4. Antenna system according to one of the preceding clauses, wherein said first direction and said second direction are converging directions.
5. Antenna system according to one of the preceding clauses, wherein the control unit is configured to control one or more beamforming networks to cause a primary phased array of an antenna panel to generate a primary radiation beam in a first direction and to simultaneously cause a secondary phased antenna array of an adjacent panel to generate a secondary radiation beam in a second direction, such that a constructive superposition of the electromagnetic fields relevant to the primary and secondary beams is obtained, and such that the power of the secondary beam is gradually adjusted, in particular gradually increased.
6. Antenna system according to one of the preceding clauses, wherein adjacent panels have a mutually common side edge, wherein both the first direction of the primary beam generated by the primary phased antenna array and the second direction of the secondary beam generated by the secondary phased antenna array are directed towards said common side edge.
7. Antenna system according to one of the preceding clauses, wherein the control unit is configured to control one or more beamforming networks to cause a phased array of an antenna panel to generate a radiation beam in a moving direction from one side of the antenna panel to an opposing side of the antenna panel.
8. Antenna system according to one of the preceding clauses, wherein the control unit is configured to control one or more beamforming networks to cause a primary phased array of an antenna panel to generate a primary radiation beam in a first direction and to simultaneously cause a secondary phased antenna array of an adjacent panel to generate a secondary radiation beam in a second direction, such that a constructive superposition of the electromagnetic fields relevant to the primary and secondary beams is obtained, based upon the mutual orientation of said antenna panels and the operating frequency of the phased antenna arrays.
9. Antenna system according to one of the preceding clauses, wherein the superposed electromagnetic waves of the primary beam and the secondary beam define a composite beam which extends in the first direction.
10. Antenna system according to one of the preceding clauses, wherein the superposed electromagnetic waves of the primary beam and the secondary beam define a composite beam, wherein control unit is configured to generate a plurality of composite beams in N different directions, wherein N is equal to the number of antenna panels.
11. Antenna system according to clause 10, wherein the control unit is configured to successively generate different composite beams.
12. Antenna system according to one of the preceding clauses, wherein the control unit is configured to control one or more beamforming networks to cause a phased array of an antenna panel to generate a boresight radiation beam in a direction perpendicular to a plane defined by said antenna panel.
13. Antenna system according to clause 11 and 12, wherein the control unit is configured to alternately generate at least one composite beam and at least one boresight beam.
14. Antenna system according to one of the preceding clauses, wherein the number of antenna panels is equal to N, wherein N is an integer larger than or equal to 3 or 4, wherein the angle enclosed by the normal vectors to adjacent antenna panels is 360/N degrees.
15. Antenna system according to clause 14, wherein a primary angle enclosed by the normal of an antenna panel and said first direction is equal to Ω degrees, and wherein a secondary angle enclosed by the normal of an adjacent panel and said first direction is equal to ((360/N)−Ω) degrees.
16. Antenna system according to one of the preceding clauses, wherein the control unit is configured to control one or more beamforming networks to cause the secondary phased array of an antenna panel to generate a secondary radiation beam in a second direction, wherein said second direction and a plane defined by said antenna panel mutually encloses an angle between 0 and 10 degrees.

17. Antenna system according to one of the preceding clauses, wherein the number of antenna panels is equal to N, wherein N is an integer larger than or equal to 3 or 4, wherein each antenna panel defines a plane, and wherein the angle enclosed by planes defined by adjacent panels is 360/N degrees.

18. Antenna system according to one of the preceding clauses, wherein the rear side of each panels faces the rear side of at least one other antenna panel.

19. Antenna system according to one of the preceding clauses, wherein the antenna panels are positioned at a distance from each other, preferably a smallest distance smaller than 15 millimetres.

20. Antenna system according to one of the preceding clauses, wherein the control unit is configured to compute and/or measure a value of the phase shift between the primary beam and the secondary beam to realize a constructive superposition of the electromagnetic fields relevant to the primary and secondary beams.

21. Antenna system according to one of the preceding clauses, wherein the control unit is configured to control one or more beamforming networks to cause each antenna element of at least one phased antenna array to generate electromagnetic waves mutually extending in substantially the same direction.

22. Antenna system according to one of the preceding clauses, wherein the antenna panels are flat.

23. Antenna system according to one of the preceding clauses, wherein each phased antenna array comprises at least one row, preferably at least two rows, of at least four antenna elements.

24. Antenna system according to one of the preceding clauses, wherein the phased antenna arrays are configured to operate in the millimetre frequency band.

25. Antenna system according to one of the preceding clauses, wherein the antenna panels are mounted on a supporting structure.

26. Antenna system according to one of the preceding clauses, wherein a plane defined by each phased antenna array is a vertical plane.

27. Antenna system according to one of the preceding clauses, wherein the antenna system is configured to generate beams collectively covering the full azimuthal plane.

28. Antenna system according to one of the preceding clauses, wherein the antenna system is configured as base station, repeater, router, and/or access point.

29. Antenna system according to one of the preceding claims, wherein the control unit is configured to control one or more beamforming networks to cause all antenna elements of a primary phased array of an antenna panel to generate a primary radiation beam in a first direction and to simultaneously cause all antenna elements of a secondary phased antenna array of an adjacent panel to generate a secondary radiation beam in a second direction.

30. Control unit for use in an antenna system according to one of the preceding clauses.

31. Method for operating an antenna system according to one of clauses 1-29, wherein the control unit is activated to control one or more beamforming networks to cause a primary phased array of an antenna panel to generate a primary radiation beam in a first direction and to simultaneously cause a secondary phased antenna array of an adjacent panel to generate a secondary radiation beam in a second direction, such that a constructive superposition of the electromagnetic fields relevant to the primary and secondary beams is obtained.

The invention will be further elucidated by means of non-limiting exemplary embodiments illustrated in the following figures. Within these figures, similar reference numbers correspond to similar or equivalent elements or features.

Figure 1B:
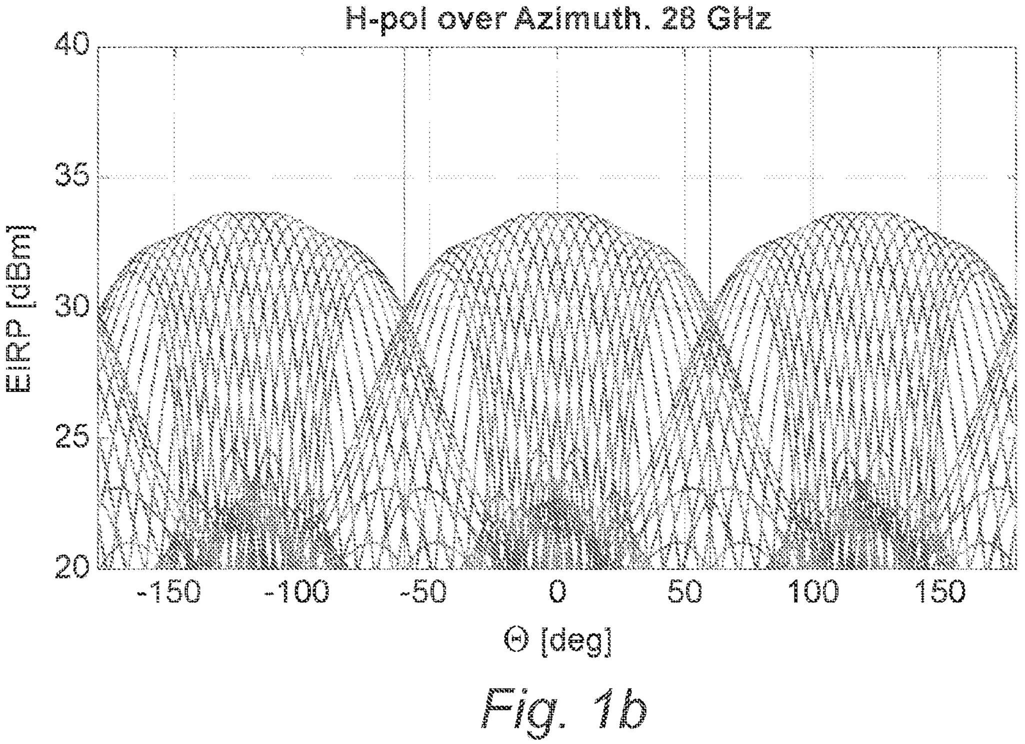
Figure 1C:
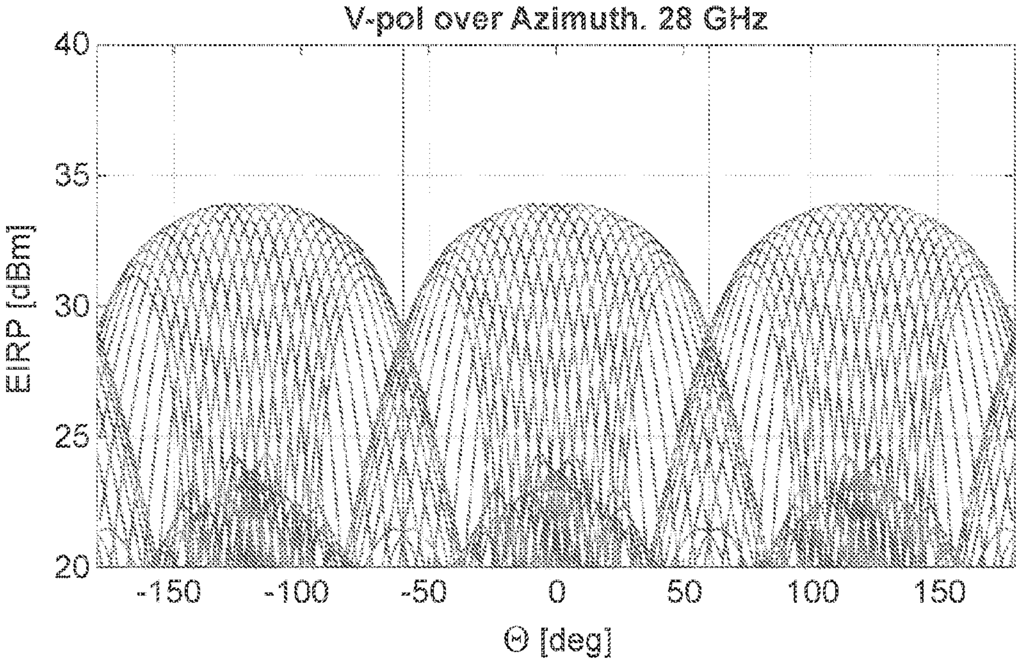

FIG. 1*a* shows a schematic representation of a conventional antenna system. The figures show three phased antenna arrays 201, 202, 203. Each phased antenna array 201, 202, 203 comprises multiple antenna elements. The system further comprises at least one, and preferably at least three beamforming networks, wherein the beamforming networks are coupled with the phased antenna arrays 201, 202, 203. The beamforming networks are configured to control the excitation phase of each antenna element integrated in the phased antenna arrays 201, 202, 203. The phased antenna arrays 201, 202, 203 can possibly be embedded in panels. In the shown embodiment, the phased antenna arrays 201, 202, 203 are positioned in an equilateral triangular arrangement where each phased antenna array 201, 202, 203 is able to scan the beam up to 60 degrees from the boresight in azimuth. Hence, the phased antenna arrays 201, 202, 203 are configured to cover the azimuthal plane along 360 degrees. The figure shows for each phased antenna array 201, 202, 203 the 120-degree wide sectors S1, S2, S3 up to which they can scan. The phased antenna arrays 201, 202, 203 can work independently. The first phased antenna array 201 only contributes to the first sector S1, the second phased antenna array 202 only contributes to the second sector S2 and the third phased antenna array 203 only contributes to the third sector S3. Hence, in theory, the phased antenna arrays 201, 202, 203 can cover the azimuthal plane along 360 degrees. However, a drawback of this conventional system is that the beam intensity reduces progressively with the scan angle when moving away from the boresight B of a phased antenna array 201, 202, 203. This is shown in FIGS. 1*b* and 1*c* which show respectively the horizontal EIRP pattern (H-pol) and the vertical EIRP pattern (V-pol). These figures show the Effective Isotropic Radiated Power (EIRP in dBm) at the y-axis versus the azimuthal angle (in degrees). The facet boresight B shows the direction of highest radiation intensity for the individual phased antenna array 201. The boresight is the direction perpendicular to the individual phased antenna array 201, 202, 203. It can be seen in the graphs that the highest beam intensity is observed at 0, 120 and −120 degrees. The lowest radiation intensity for the individual phased antenna arrays is observed at +60 and −60 degrees as measured from the boresight of each individual phased antenna array. Here, the power level at the input terminals of each antenna element of the phased antenna arrays is 10 dBm. The azimuth EIRP pattern with a 5 degree scan increment is shown. The H-pol EIRP pattern shows 3.5 dB scan loss (55% power reduction), whereas the V-pol pattern shows 4.8 dB scan loss (67% power reduction), at the +/−60-degree angles.

Figure 2A:
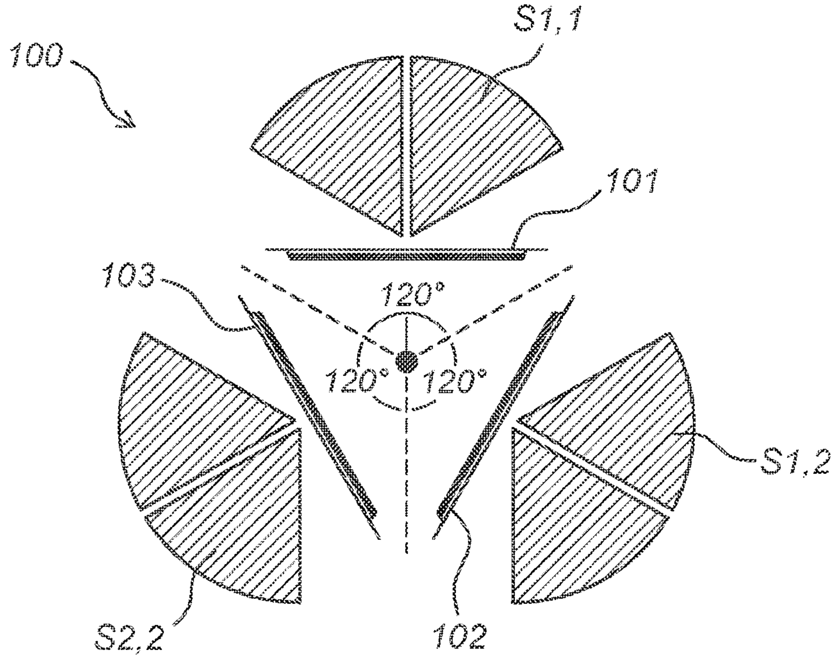
Figure 2B:
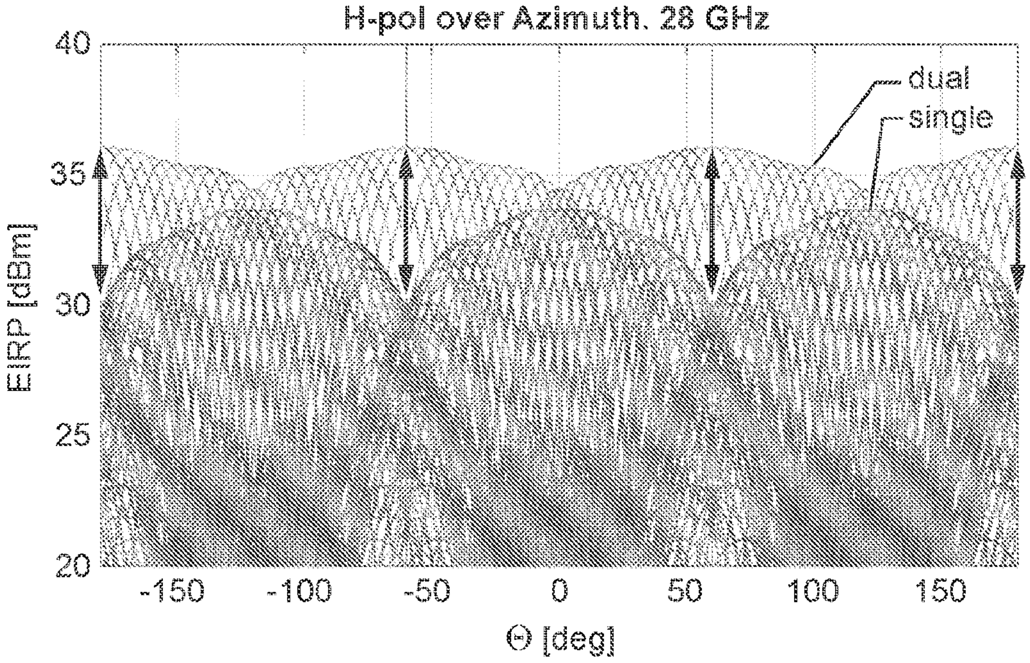
Figure 2C:
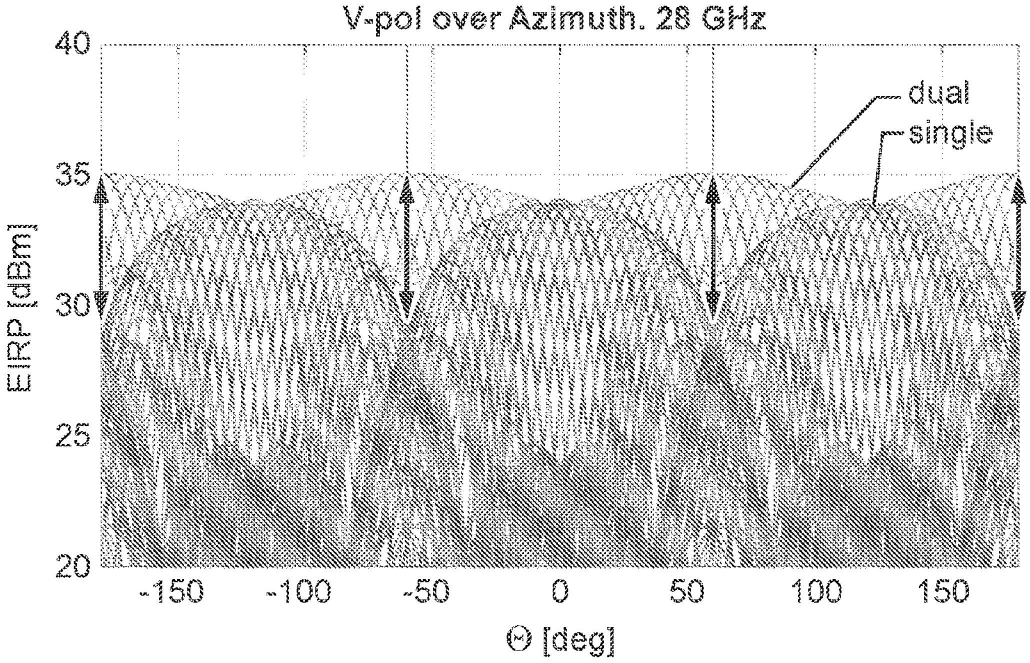

FIG. 2*a* shows a possible embodiment of an antenna system 100 for antenna beamforming according to the present invention. The antenna system 100 as shown comprises three phased antenna arrays 101, 102, 103. Each phased antenna array 101, 102, 103 comprises multiple antenna elements. The phased antenna arrays 101, 102, 103 are positioned such that each phased antenna array has two adjacent phased antenna arrays 101, 102, 103 and such that the phased antenna arrays 101, 102, 103 enable 360 degrees coverage along the azimuthal plane. The phased antenna arrays 101, 102, 103 can be embedded in panels. The system 100 further comprises at least one, and preferably at least three beamforming networks integrated with the phased antenna arrays 101, 102, 103. The beamforming network/networks is/are configured to control the excitation phase of each antenna element integrated in the phased antenna arrays 101, 102, 103. The system 100 further comprises a control unit which is configured to control the beamforming network(s). The phased antenna arrays 101, 102, 103 are configured to operate in the sub-millimetre-frequency band, in particular at 28 GHz. As indicated, a problem of the conventional antenna system is that a reduction of the beam intensity which can be in the range of 3 to 5 dB is observed when moving away from the boresight. The invention provides a system 100 and method to compensate for the scan losses. This is achieved by proper control of the input power and/or excitation phase of the antenna elements integrated in the phased arrays 101, 102, 103. In particular, a (primary) beamforming network is actuated and controlled such that a suitable phase is enforced for each antenna element in the primary phased array 101 so to generate a radiation beam along a predetermined direction along the azimuthal plane. Substantially simultaneously, a (secondary) beamforming network is actuated and controlled such that a suitable phase is enforced for each antenna element in the secondary phased array 102, which is positioned adjacent to said primary phased array 101, so to achieve a constructive superposition of the radio waves originated from the primary phased antenna array 101 and the secondary phased antenna array 102 in the predetermined direction along the azimuthal plane. For the embodiment of the system 100, as shown in FIG. 2*a*, this means that the adjacent phased antenna arrays having reference number 101 and 102 co-act in order to obtain a favourable beam intensity for scanning in the first subsector S1,1. The intensity of the radiation beam excited by the primary phased antenna array 101 in a predetermined direction along the azimuthal plane within the subsector S1,1, is enhanced by the radiation beam originated by the secondary phased antenna array 102. In line with this, in case the phased antenna array having reference number 102 is seen as primary phased antenna array 102, the intensity of the relevant radiation beam in a predetermined direction along the azimuthal plane within the subsector S1,2, is enhanced by the radiation beam originated by the secondary phased antenna array 101. This interaction applies for all the phased antenna arrays 101, 102, 103 and their adjacent phased antenna arrays 101, 102, 103. When focusing on another subsector, for example subsector S2,2, the adjacent phased antenna arrays having reference number 102 and 103 co-act in order to obtain an enhanced beam intensity for scanning in the subsector S2,2. For said subsector S2,2 phased antenna array having reference number 103 acts as primary phased antenna array 103 which excites a radiation beam directed in a predetermined direction along the azimuthal plane within subsector S2,2. Said radiation beam is enhanced by the radiation beam originating from the secondary phased antenna array 102, in this case again the phased antenna array having reference 102. As said, this interaction applies for all phased antenna arrays 101, 102, 103 and their adjacent phased antenna arrays 101, 102, 103. That the system 100 according to the present invention compensates for the scan losses can be seen in FIGS. 2*b* and 2*c*. FIGS. 2*b* and 2*c* show respectively the horizontal EIRP patterns (H-pol) and the vertical EIRP pattern (V-pol). These figures show the Effective Isotropic Radiated Power (EIRP in dBm) at the y-axis versus the azimuthal angle (in degrees). It can be seen in the graphs that the beam intensity observed at +60 and −60 degrees as seen from the boresight of each individual phased antenna array is significantly increased. The H-polarization and V-polarization scan losses are compensated with an excess of 3.6 dB and 1.2 dB, respectively, at +/−60 degrees scan angles from the phased antenna array boresights. The EIRP enhancement is 6.02 dB for each polarization using coordinated phased antenna arrays rather than array panels in stand-alone operation. It was experimentally found that this effect is valid for any number of antenna elements per phased antenna array.

Figure 3:
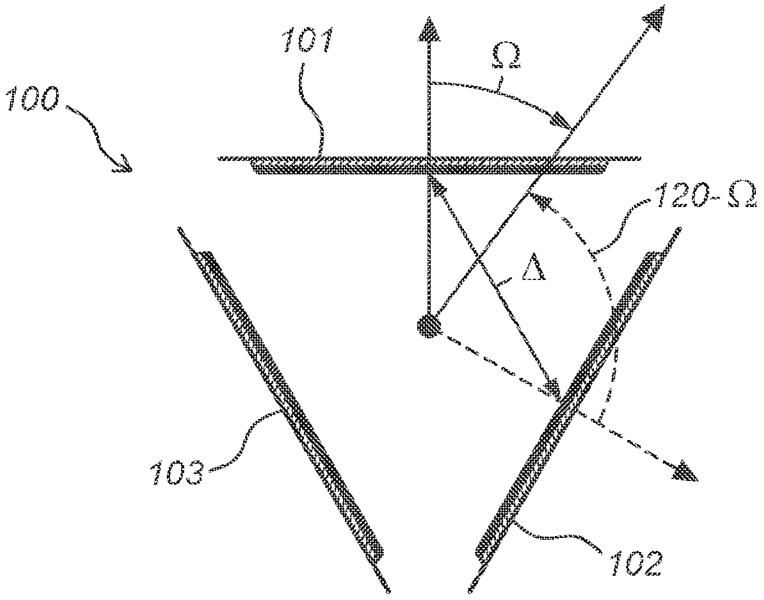

FIG. 3 shows the system 100 as shown in FIG. 2*a*. The antenna system 100 as shown comprises three phased antenna arrays 101, 102, 103. Each phased antenna array 101, 102, 103 comprises multiple antenna elements. The phased antenna arrays 101, 102, 103 are positioned such that each phased antenna array has two adjacent phased antenna arrays 101, 102, 103 and such that the phased antenna arrays 101, 102, 103 enable 360 degrees coverage along the azimuthal plane. The phased antenna arrays 101, 102, 103 can be embedded in panels. The system 100 comprises at least one, and preferably at least three beamforming networks connectable or connected to the phased antenna arrays 101, 102, 103. For the shown embodiment, all phased antenna arrays 101, 102, 103 are assumed to be aligned in the direction which is orthogonal to the azimuthal plane. The phase management of the system is controlled by at least one control unit. In the shown embodiment, the radio wave signals of the primary phased antenna arrays 101 and the secondary phased antenna array 102 are superimposed constructively within the subsector S1,1 (as shown in FIG. 2*a*) towards a depicted direction. This identifies the angular region from 0 to 60 degrees measured clockwise from the normal to the primary phased antenna array 101. The depicted direction is denoted by the angle Ω. Hence, the control unit and/or the array beamforming network enable a progressive phase shift applied to the excitation signals at the input terminals of the antenna elements embedded in the primary phased array 101 such that the beam produced by said primary phased antenna array 101 will be pointed along an angular direction of Ω degrees measured clockwise in azimuth from the relevant normal. Seen from the common coordinate system, the beam produced by the secondary phased antenna array 102 will be pointed along the same angular direction which is 120 degrees−Ω measured counter-clockwise in azimuth from the normal of the secondary phased antenna array 102. In addition to the above-described progressive phased shift, also a first direction specific phase shift and a second direction specific phase shift apply to the antenna elements of the phased antenna arrays 101, 102. A first direction (Ω) specific phase shift is common to all antenna elements of primary antenna array 101 and accordingly, a first direction (120 degrees−Ω) specific phase shift is common to all antenna elements of secondary antenna array 102. The value of the first direction specific phase shift depends on the location of the centre of the secondary antenna array 102 relative to centre of the primary antenna array 101 as well as on the operating frequency. The location of the centre of the secondary antenna array 102 relative to centre of the primary antenna array 101 is indicated in the figure with reference A. The value of the phase shift is determined as a phase difference between the signals radiated by the isotropic sources (or measured identical antennas identically oriented) residing in the centres of the two phased antenna arrays 101, 102 toward the direction Ω with the source (antenna) at the centre of the primary phased antenna array 101 being the reference. If the determined value is negative the (first direction specific) phase shift applies to the antenna elements of the primary phased array 101, if the determined value is positive the (first direction specific) phase shift applied to the antenna elements of the secondary phased array. A second direction specific phase shift is related to the far-field phase values of the signals radiated by the two phased antenna arrays 101, 102 in the direction of interest (Ω). In particular, the direction of interest is towards the azimuth angle Ω measured clockwise for the primary phased antenna array 101 from its own outward normal direction and the azimuth angle 120 degrees−Ω measured counter-clockwise for the secondary phased antenna array 102 from its own outward normal direction. The value of the second direction specific phase shift is determined as the far-field phase of primary phased antenna array 101 toward the angular direction Ω measured clockwise from the relevant outward normal minus the far-field phase of the secondary phased antenna array 102 toward the angular direction 120 degrees−Ω measured counter-clockwise from the relevant outward normal. The aforementioned far-fields can be determined, for example by simulation and/or experimental measurements. If the determined (second direction specific) phase shift value is positive then the phase shift applies to the antenna elements of the primary phased array 101, and otherwise to the antenna elements of the secondary phased array 102. Both the determined first and second direction specific phase shifts are the same for all antenna elements of the particular phased array 101, 102 to which they should be applied. The insertion phase shift applied to the RF beamforming network of a particular antenna element is the sum of said progressive phase shift, first direction specific phase shift and the second direction specific phase shift.

Figure 4A:
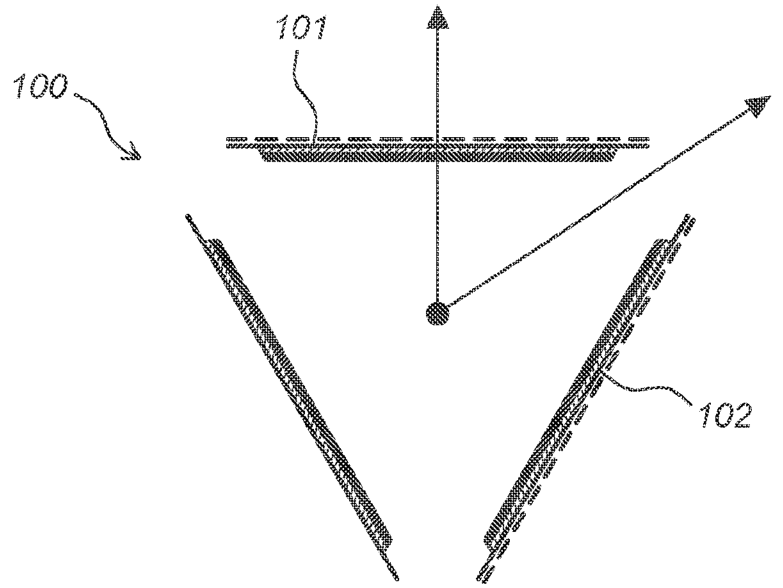
Figure 4B:
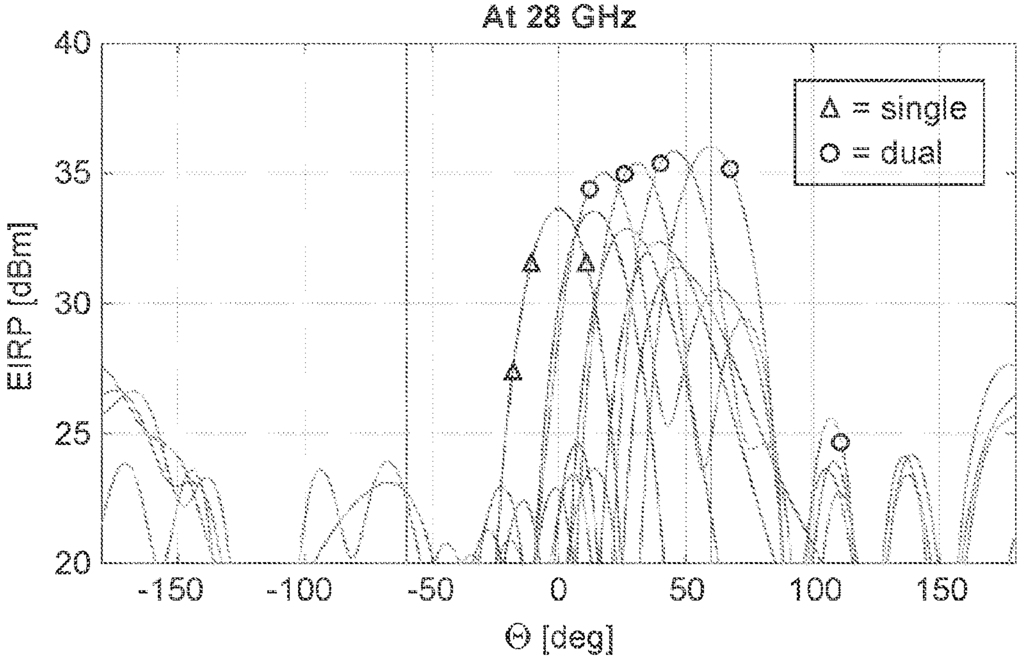

FIGS. 4*a* and 4*b* indicate the difference between the use of a single phased antenna array 101 and the effect of the co-action between a primary phased antenna array 101 and a secondary phased antenna array 102 (dual configuration). FIG. 4*a* shows an embodiment of the system 100 according to the present invention which is equivalent to the systems 100 shown in the previous figures. FIG. 4*b* shows the H-pol EIRP pattern (in dBm) for both the single configuration and the dual configuration. For the shown results, the power level at the input terminals of each antenna element of the phased antenna arrays 101, 102 is 10 dBm. This means that the control unit actuates either one or two phased antenna arrays 101, 102. Here, the H-pol EIRP pattern for the single configuration is determined for different scan angles from the boresight to 60 degrees with 15-degree steps. The H-pol EIRP pattern for the dual configuration (the primary and secondary phased antenna arrays 101, 102 operating concurrently) is also determined for different scan angles from the boresight of the primary panel up to 60 degrees with 15-degree steps. As it can be noticed, the EIRP increases as it is scanned away from the boresight of the primary phased antenna array 101 when considering the dual configuration.

Figure 5A:
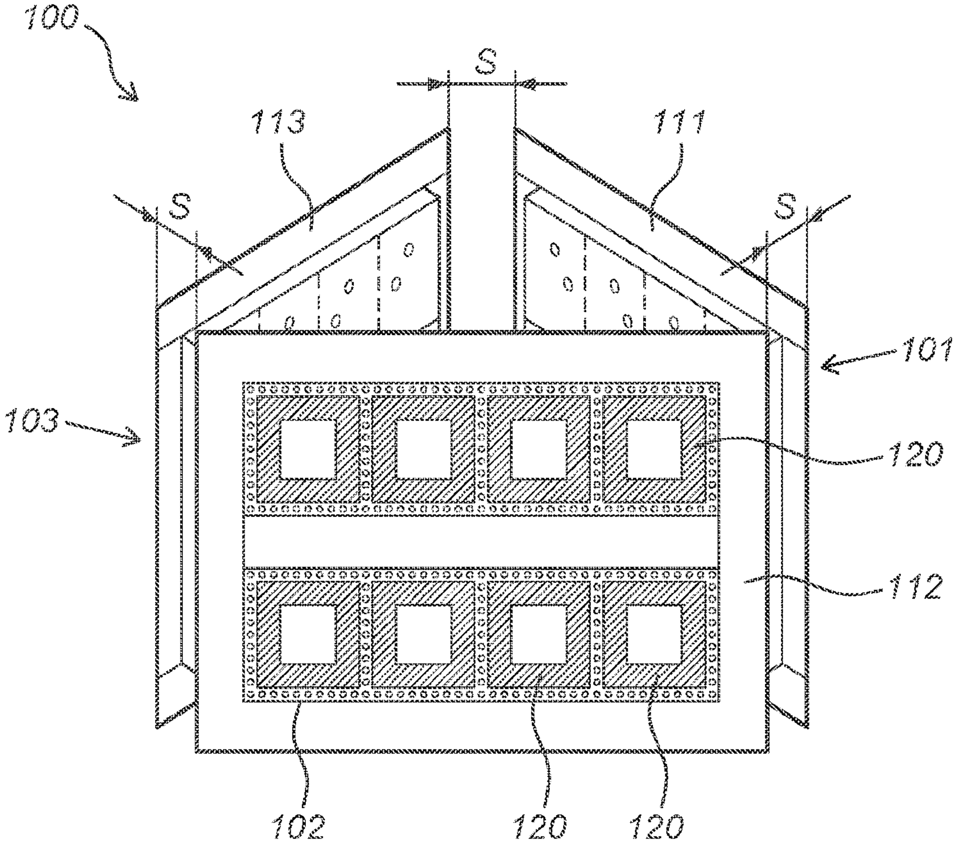
Figure 5B:
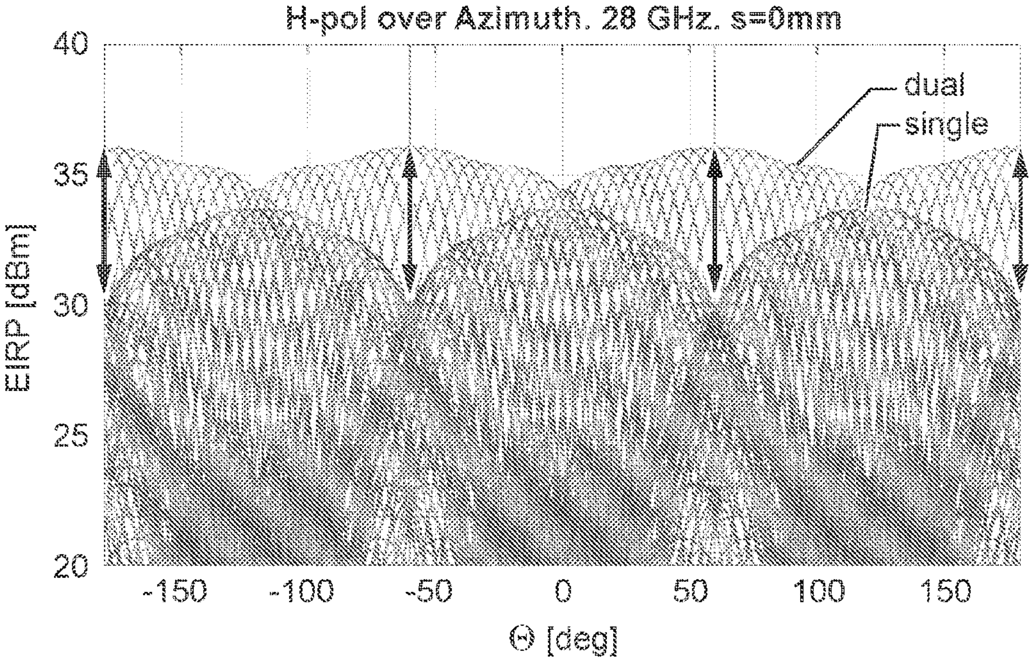
Figure 5C:
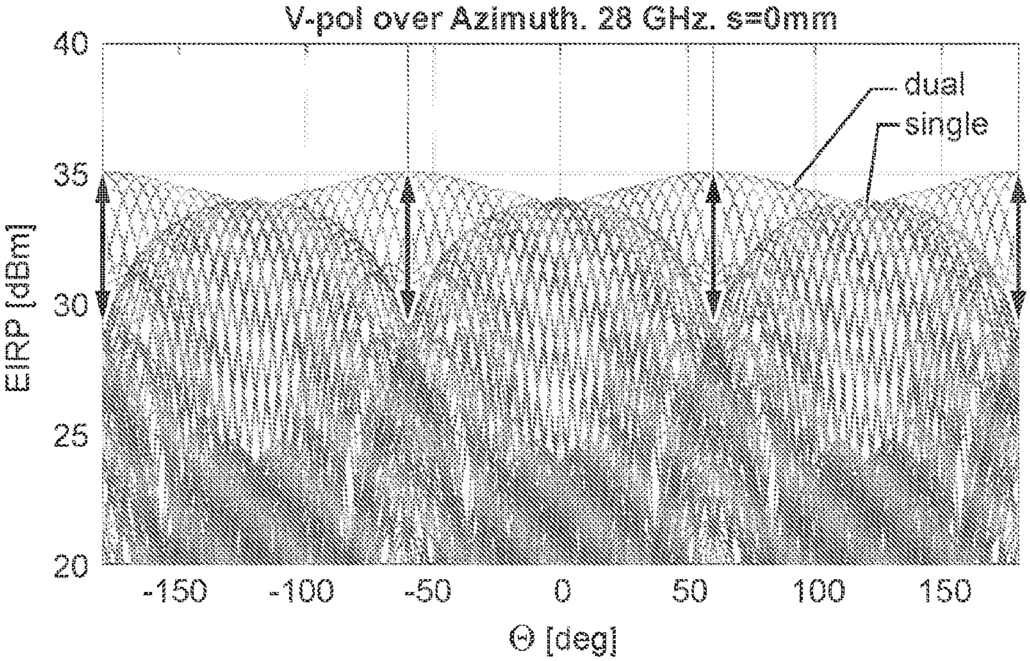
Figure 5D:
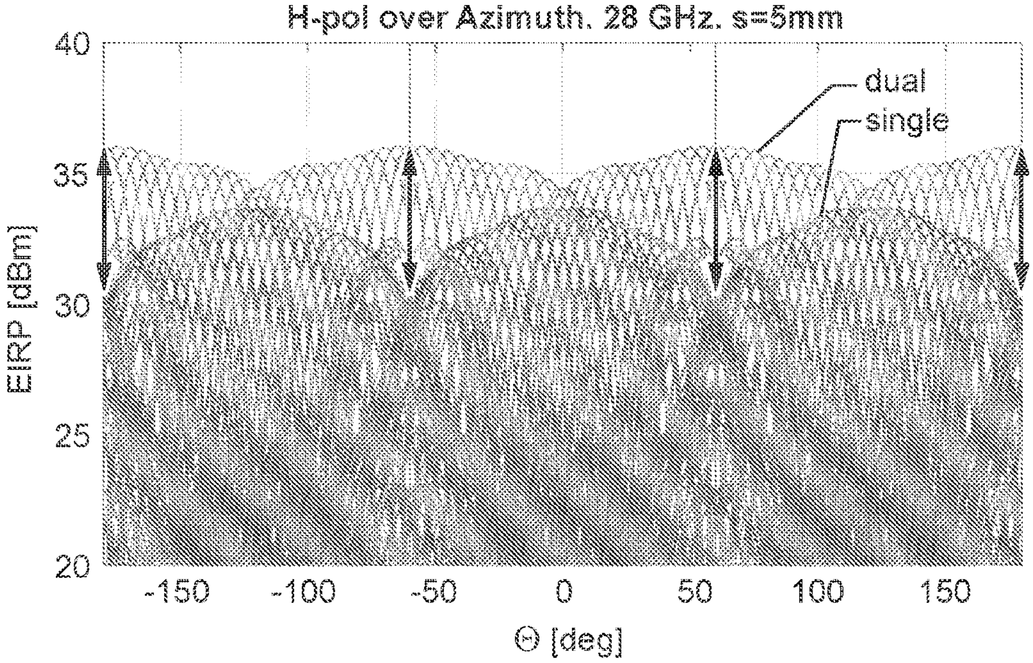
Figure 5E:
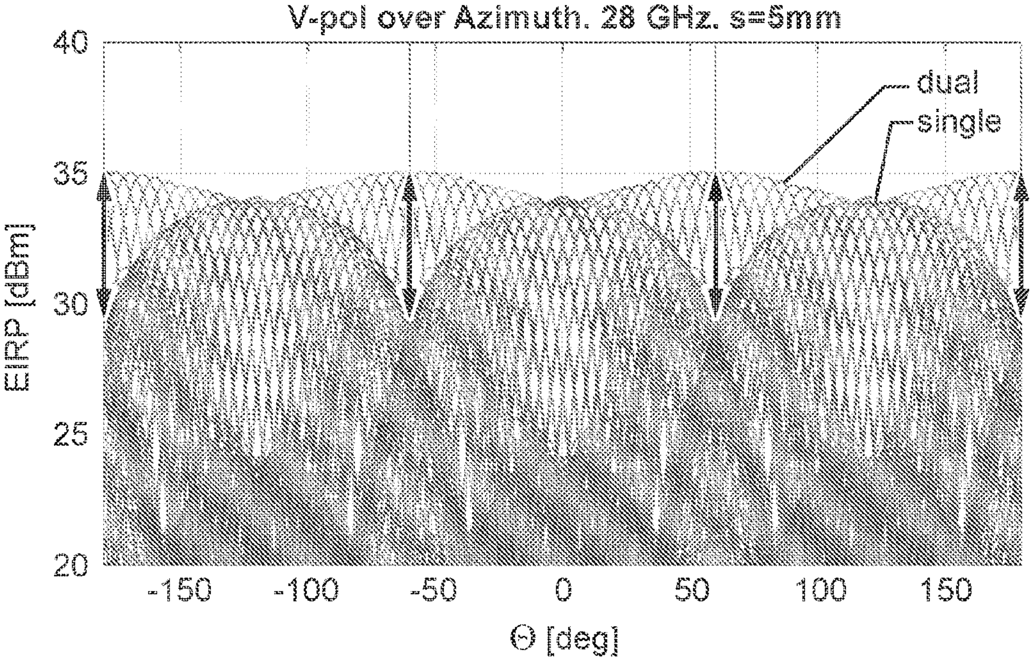
Figure 5F:
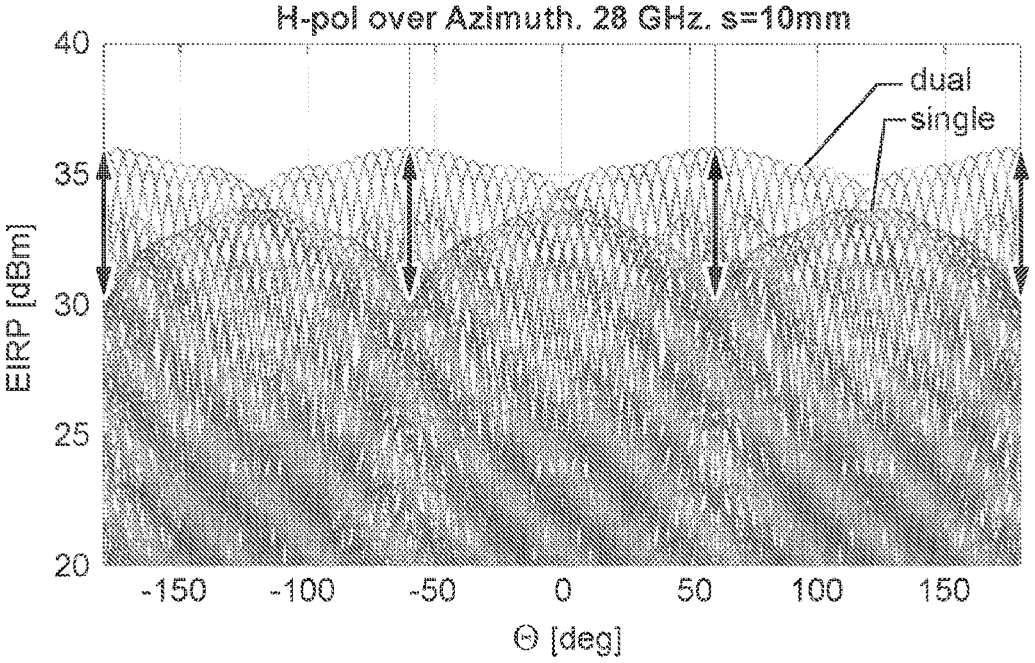
Figure 5G:
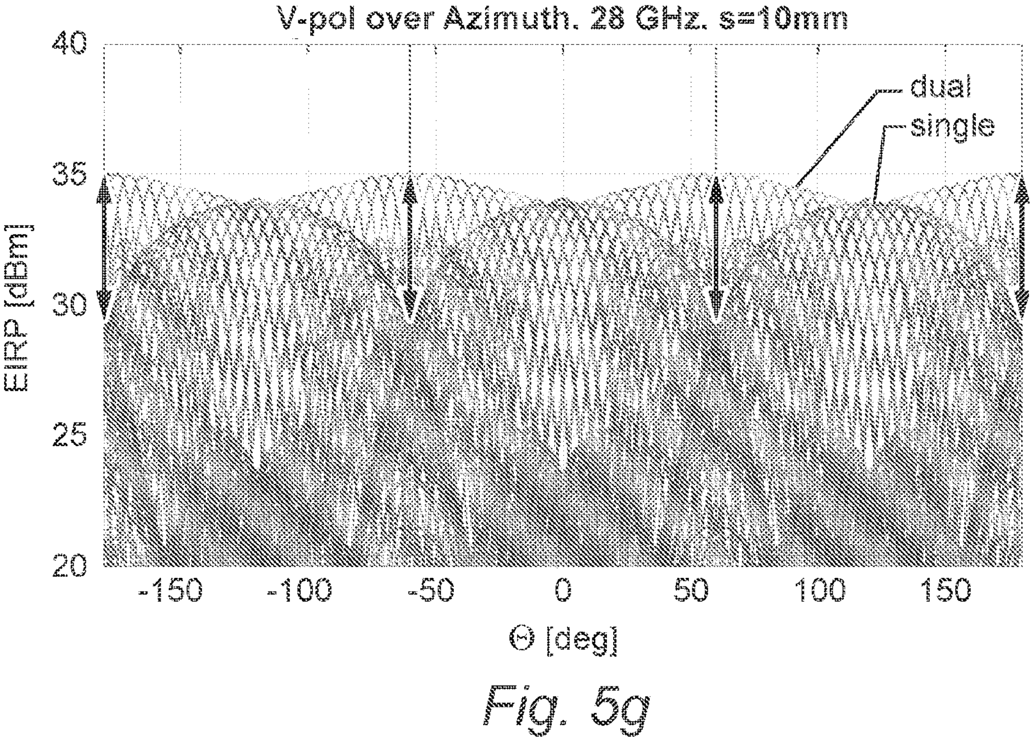

FIG. 5*a* shows a schematic representation of an antenna system 100 according to the present invention. The system 100 comprises three antenna panels 111, 112, 113, wherein each panel 111, 112, 113 has a rear side and a front side, wherein the front side of each panel comprises at least one phased antenna array (PAA) 101, 102, 103. Each phased antenna array 101, 102, 103 comprises at least one array of antenna elements 120. The antenna panels 111, 112, 113 are positioned such that the phased antenna arrays 101, 102, 103 enable omnidirectional coverage at least along the azimuthal plane and/or coverage along all angular directions of the azimuthal plane. The system 100 further comprises one or more beamforming networks, in particular radio frequency (RF) beamforming networks, wherein each phased antenna array 101, 102, 103 is connectable or connected to at least one of said one or more beamforming networks to adjust phase shifts associated with the antenna elements 120 of said phased antenna array 101, 102, 103 to generate an electromagnetic radiation beam. In the shown embodiment, each antenna panel 111, 112, 113 has a 2×4 antenna element configuration. The system 100 further comprises a control unit connectable or connected to the beamforming network(s). The control unit is at least configured to control one or more beamforming networks to cause a primary phased antenna array 101, 102, 103 of an antenna panel 111, 112, 113 to generate a primary radiation beam in a first direction and to simultaneously cause a secondary phased antenna array 101, 102, 103 of an adjacent panel 111, 112, 113 to generate a secondary radiation beam in a second direction, wherein preferably the first direction substantially equals the second direction such that a constructive superposition of the electromagnetic fields of the primary and secondary beams is obtained. The antenna panels 111, 112, 113 are positioned at a distance S from each other. FIGS. 5*b*-5*g* show the graphs of the horizontal EIRP patterns (H-pol—FIGS. 5*b*, 5*d*, 5*f*) and the vertical EIRP pattern (V-pol—FIGS. 5*c*, 5*e*, 5*g*) for different distances S. The separations S between array facets which are tested are S=0, S=5, and S=10 mm. For all tests a uniform amplitude tapering with 10 dBm power level at the input terminals of the antenna elements 120 was applied. The FIGS. 5*b*-5*g* show the Effective Isotropic Radiated Power (EIRP in dBm) at the y-axis versus the azimuthal angle (in degrees). It can be seen in the graphs that the beam intensity observed at +60 and −60 degrees from the boresight of the individual phased antenna array is significantly increased. The H-polarization and V-polarization scan losses are compensated with an excess of 3.6 dB and 1.2 dB, respectively, at +/−60 degrees scan angles from the phased antenna array boresights. The EIRP enhancement is 6.02 dB for each polarization using coordinated phased antenna arrays 101, 102, 103 rather than array panels in stand-alone operation. It can be seen that the separations S between array facets do not negatively affect the compensation of scan losses at and about the peak of the beam resulted from a constructive superposition.

Figure 6A:
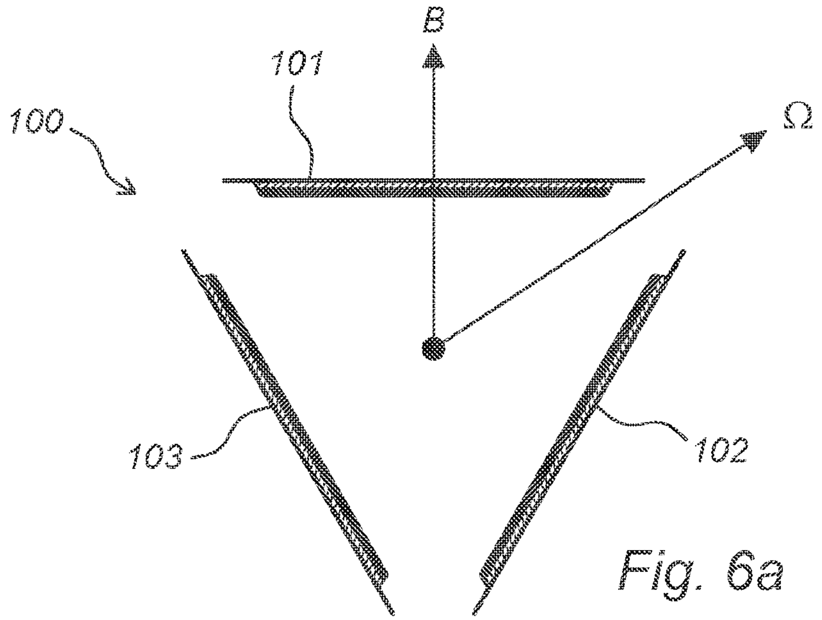
Figure 6B:
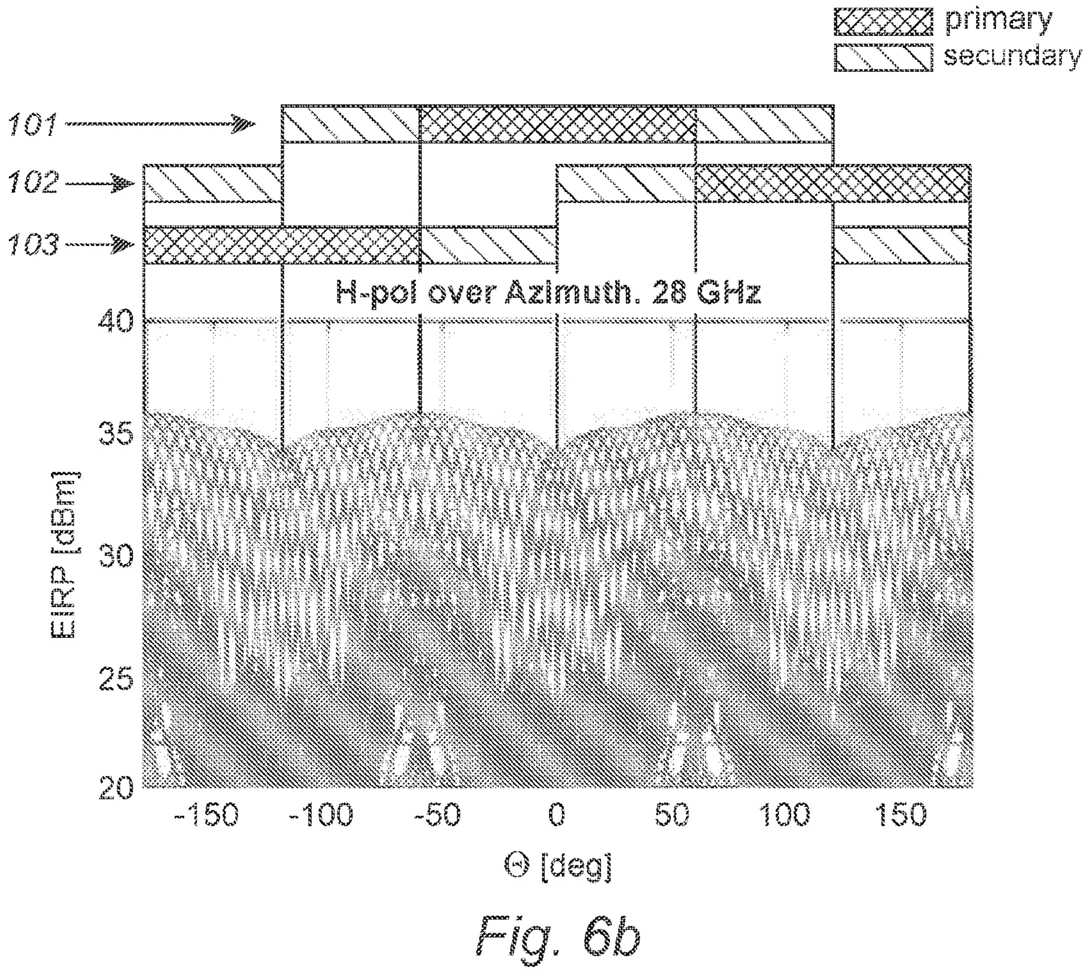

FIG. 6*a* shows again an embodiment of an antenna system 100 according to the invention wherein the phased antenna arrays 101, 102, 103 are positioned in an equilateral triangular configuration. FIG. 6*b* shows at which part of the azimuthal plane the individual phased antenna arrays 101, 102, 103 are active, either as primary antenna array or as secondary phased antenna array.

Figure 7B:
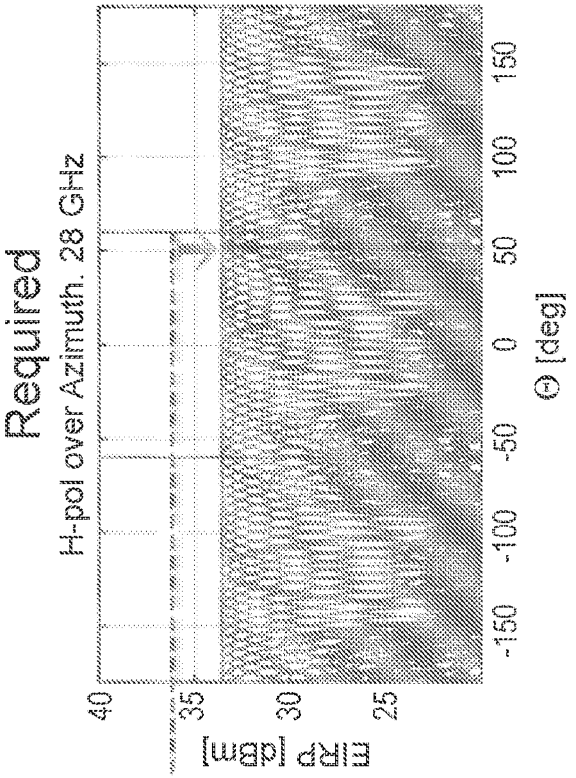
Figure 7A:
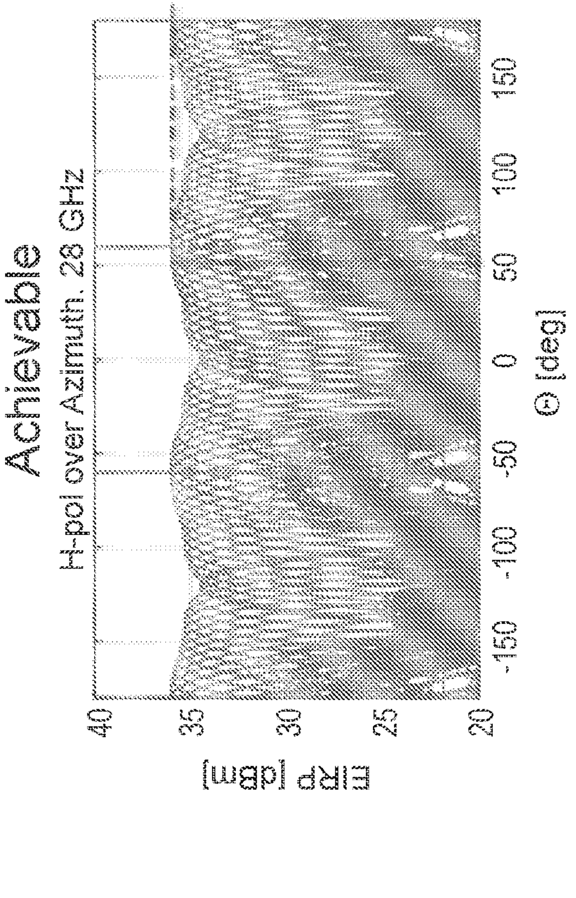

FIG. 7*a* shows a horizontal EIRP patterns (H-pol) for an antenna system according to the present invention. The figure shows the Effective Isotropic Radiated Power (EIRP in dBm) at the y-axis versus the azimuthal angle (in degrees) for an antenna system according to the present invention, where maximum achievable output is shown. FIG. 7*b* shows the effect of lowering the input power of a panel pair, i.e. adjacent primary and secondary panels, can be applied whilst keeping EIRP level on par with the maximal one which can be achieved at individual array panel level. The amount of input power lowering (in dBm per element) to be applied depends on the beam-pointing angle as well as on the embedded element pattern. In the shown example, the input can be lowered 2.4 dBm from 10 dBm per element of both panels for the 50-degree beam-pointing angle and H-polarized signal. In this case, the input power lowering (dBm per element) can be calculated by the achievable EIRP (dB) minus the required EIRP (dBm) at the angle of interest.

Figure 8C:
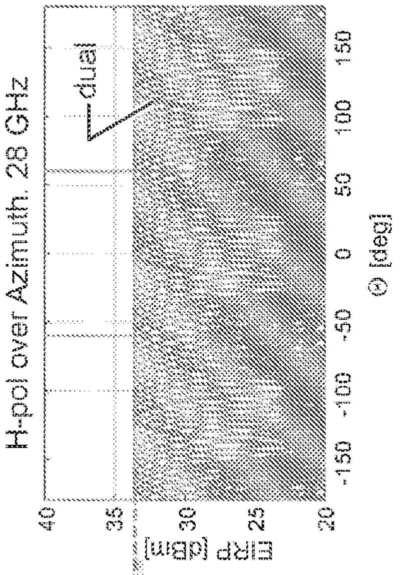
Figure 8B:
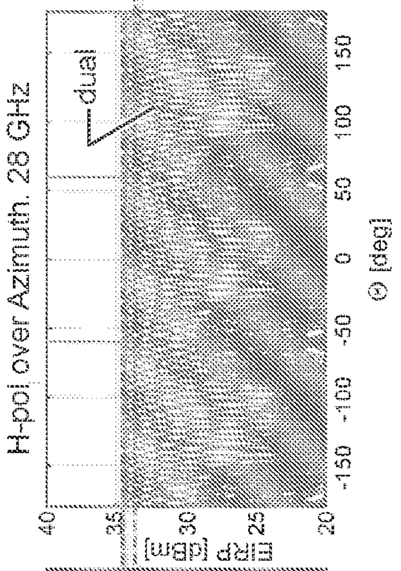
Figure 8A:
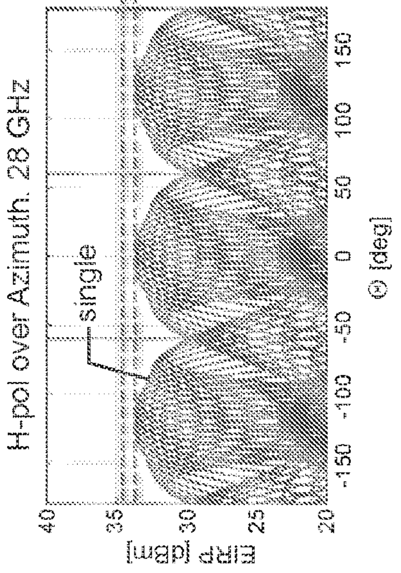

FIG. 8*a* shows the horizontal EIRP pattern (H-pol), having Effective Isotropic Radiated Power (EIRP in dBm) at the y-axis versus the azimuthal angle (in degrees) for an antenna system according to the prior art, where FIGS. 8*b* and 8*c* show the horizontal EIRP patterns (H-pol) for an antenna system according to the present invention, in particular a three-faceted active dual-polarization PAA in equilateral triangular configuration. For the antenna according to the present invention, scan losses are compensated with excess relative to the boresight EIRP, as is shown in the previous figures. The input power of every panel pair can be reduced while keeping EIRP level on par with the maximal one which can be achieved at individual array panel level (FIG. 8*a* and FIG. 8*c*) or at a higher flat level (FIG. 8*a* and FIG. 8*b*). The level to be chosen can be targeted based upon the intended application, preferably across the entire azimuthal plane (360 degrees). The same effect is applicable to the vertical EIRP pattern.

Figure 9A:
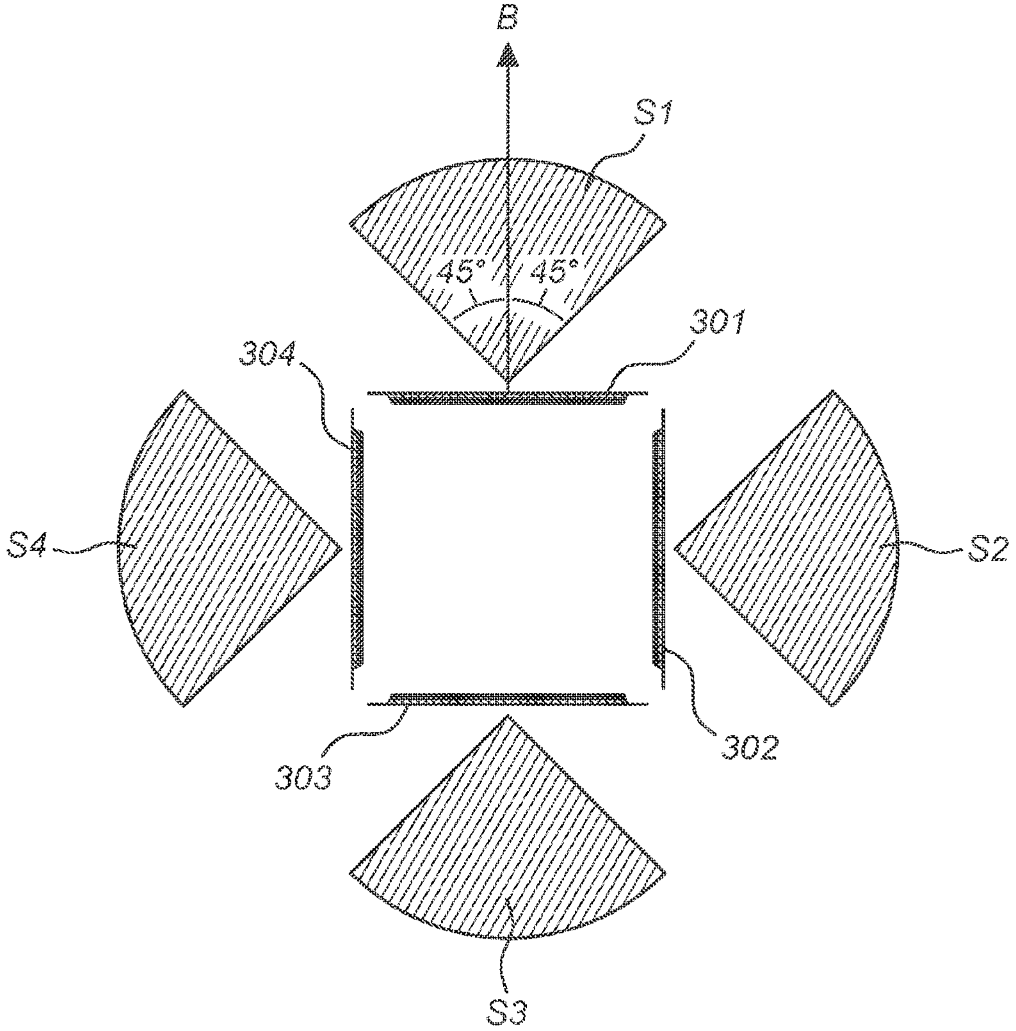
Figure 9B:
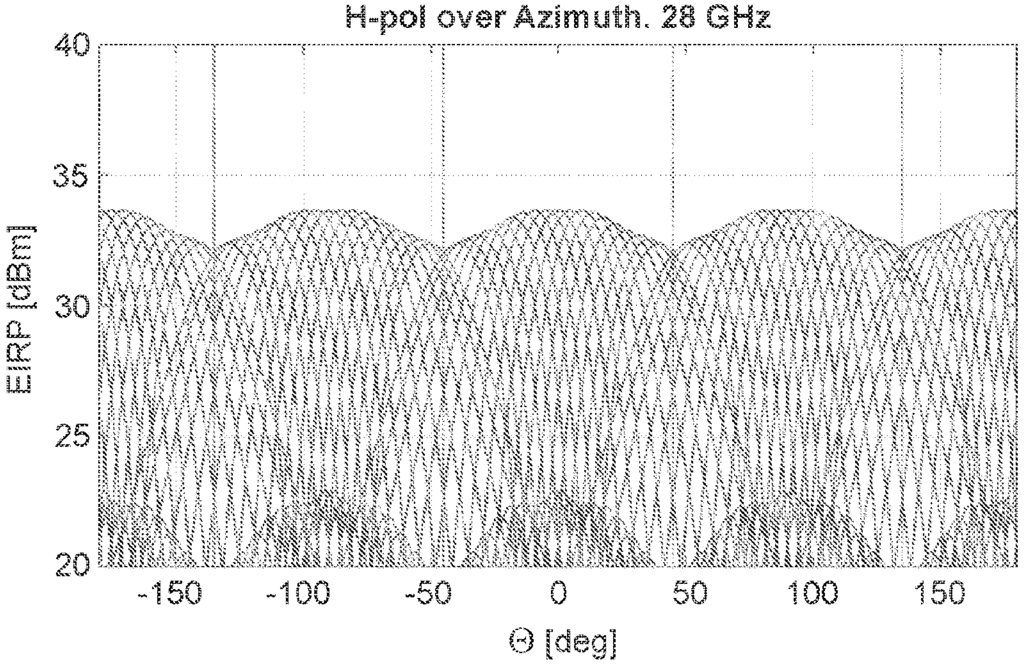
Figure 9C:
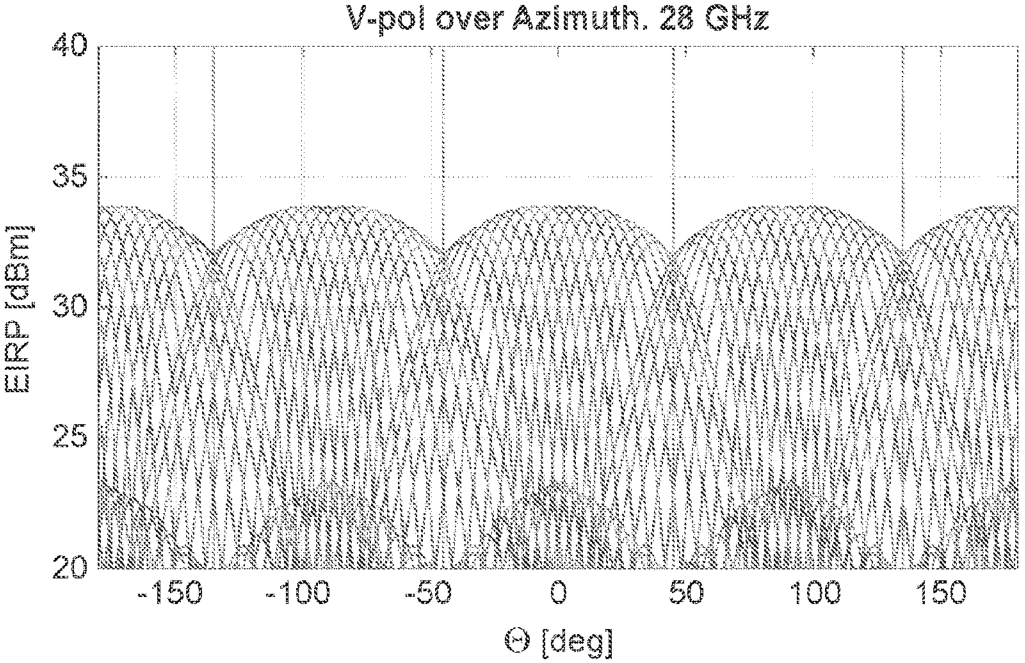

FIG. 9*a* shows a schematic representation of a conventional system of a directive antennas. The figures show four phased antenna arrays 301, 302, 303, 304. Each phased antenna array 301, 302, 303, 304 comprises multiple antenna elements. The system further comprises at least one, and preferably at least three or four beamforming networks, wherein the beamforming networks are coupled with a phased antenna array 301, 302, 303, 304. The beamforming networks are configured to drive a defined phase shift at the input terminals of each antenna element embedded in the coupled phased antenna array 301, 302, 303, 304. The phased antenna arrays 301, 302, 303, 304 can possibly be embedded in antenna panels. In the shown embodiment, the phased antenna arrays 301, 302, 303, 304 are positioned in a square arrangement where each phased antenna array 301, 302, 303, 304 is able to scan the beam up to 45 degrees from the boresight. Hence, the phased antenna arrays 301, 302, 303, 304 are configured to cover the azimuthal plane along 360 degrees. The figure shows for each phased antenna array 301, 302, 303, 304 the 90 degrees wide sector S1, S2, S3, S4 up to which it can scan. The phased antenna arrays 301, 302, 303, 304 work independently. A first phased antenna array 301 only contributes to the first sector S1, a second phased antenna array 302 only contributes a second sector S2, a third phased antenna array 303 only contributes to a third sector S3 and a fourth phased antenna array 304 only contributes to the fourth sector S4. Hence, in theory, the phased antenna arrays 301, 302, 303, 304 can cover the azimuthal plane along 360 degrees. However, a drawback of this conventional system is that the beam intensity reduces progressively with the scan angle when moving away from the boresight B of a phased antenna array 301, 302, 303, 304. This is shown in FIGS. 9*b* and 9*c* which show respectively the horizontal (H-pol) and the vertical (V-pol) EIRP patterns. These figures show the Effective Isotropic Radiated Power (EIRP in dBm) at the y-axis versus the azimuthal angle (in degrees). The facet boresight B shows the direction of highest radiation intensity for the individual phased antenna array. The boresight B is the direction perpendicular to the individual phased antenna array 301, 302, 303, 304. It can be seen in the graphs that the highest beam intensity is observed at 0, +90, −90 and 180 degrees. The lowest radiation intensity for the individual phased antenna arrays is observed at +45 and −45 degrees as seen from the boresight of each individual phased antenna array. The power level at the input terminals of each antenna element of the phased arrays is dBm. The azimuth EIRP pattern with a 5 degree scan increment is shown. The H-pol and V-pol EIRP patterns show 1.65 dB scan loss (32% power reduction) at the +/−45-degree angles.

Figure 10A:
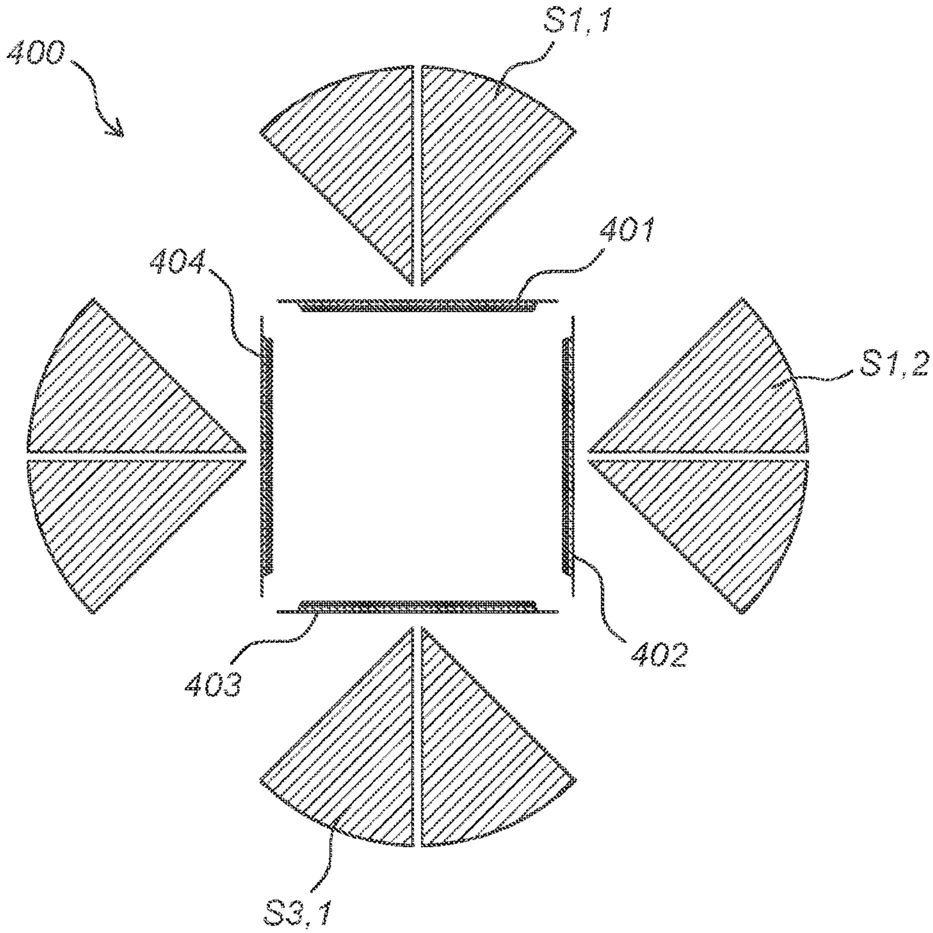
Figure 10B:
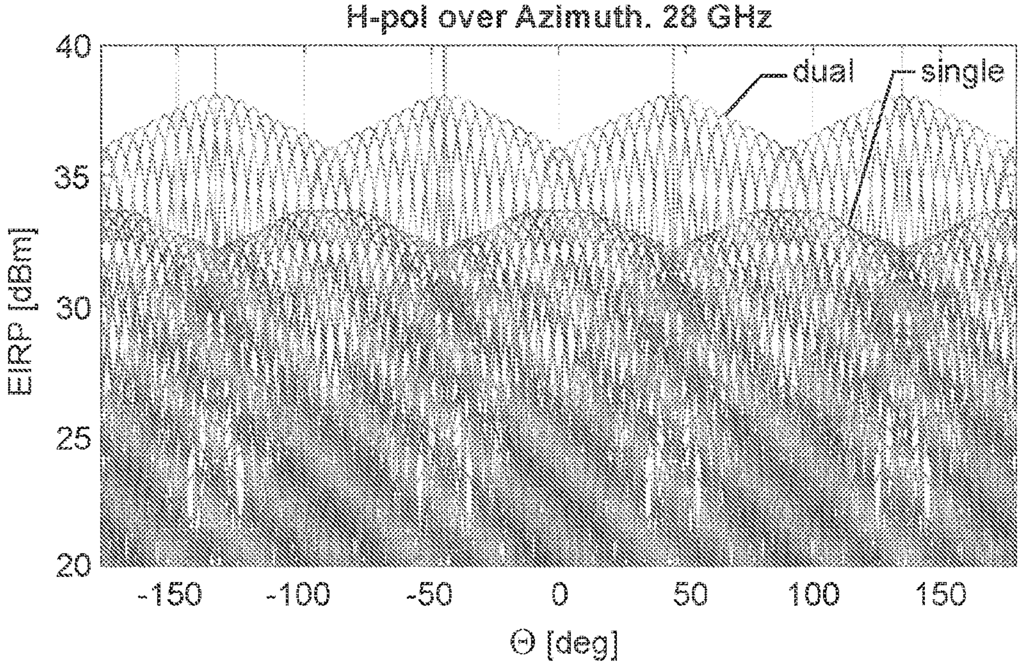
Figure 10C:
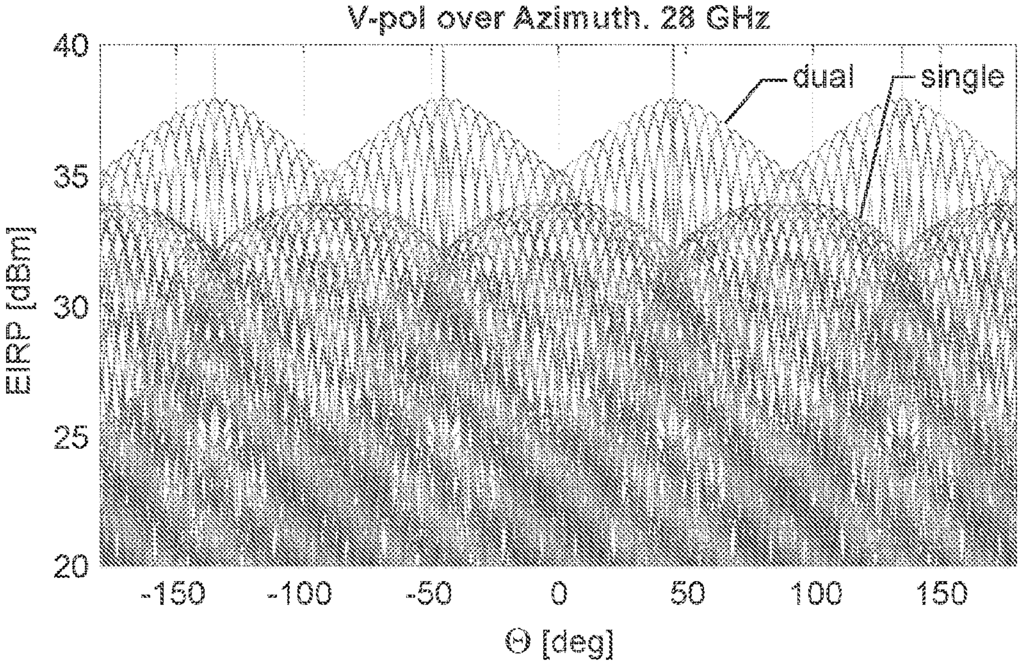

FIG. 10*a* shows a possible embodiment of an antenna system 400 for antenna beamforming according to the present invention. The antenna system 400 as shown comprises four phased antenna arrays 401, 402, 403, 404. Each phased antenna array 401, 402, 403, 404 comprises multiple antenna elements. The phased antenna arrays 401, 402, 403, 404 are positioned such that each phased antenna array has two adjacent phased antenna arrays 401, 402, 403, 404 and such that the phased antenna arrays 401, 402, 403, 404 enable 360 degrees coverage along the azimuthal plane. In the shown embodiment, the phased antenna arrays 401, 402, 403, 404 are positioned in a square configuration. The phased antenna arrays 401, 402, 403, 404 can be embedded in antenna panels. The system 400 further comprises at least one, and preferably at least four beamforming networks connectable or connected to the phased antenna arrays 401, 402, 403, 404. The beamforming network/networks is/are configured to drive a defined phase shift at the input terminals of each antenna element embedded in the coupled phased array 401, 402, 403, 404. The phased antenna arrays 401, 402, 403, 404 are configured to operate in the sub-millimetre frequency band, in particular at 28 GHz. The system 400 further comprises a control unit which is configured to control the beamforming network(s). As indicated, a problem of the convention system is that a reduction of the beam intensity is experienced when moving away from the boresight. The invention provides a system 400 and a method to compensate for the scan losses. This is achieved by proper control of the input power and/or excitation phase of the antenna elements integrated in the phased arrays 401, 402, 403, 404. In particular, a (primary) beamforming network is actuated and controlled such that a suitable phase is enforced for each antenna element in the primary phased array 401 so to generate a radiation beam along a predetermined direction along the azimuthal plane. Substantially simultaneously, a (secondary) beamforming network is actuated and controlled such that a suitable phase is enforced for each antenna element in the secondary phased array 402, which is positioned adjacent to said primary phased array 401, so to achieve a constructive superposition of the radio waves originated from the primary phased antenna array 401 and the secondary phased antenna array 402 in the predetermined direction along the azimuthal plane. For the embodiment of the system 400, as shown in FIG. 10*a*, this means that the adjacent phased antenna arrays having reference number 401 and 402 co-act in order to obtain a more favourable beam intensity for scanning in the first subsector S1,1. The intensity of the radiation beam excited by the primary phased antenna array 401 in a predetermined direction along the azimuthal plane within subsector S1,1, is enhanced by the radiation beam originating from the secondary phased antenna array 402. In line with this, in case the phased antenna array having reference number 402 is seen as primary phased antenna array 402, the intensity of the relevant radiation beam directed in a predetermined direction along the azimuthal plane within subsector S1,2, is enhanced by the radiation beam originating from the secondary phased antenna array 401. This interaction applies for all phased antenna arrays 401, 402, 403, 404 and their adjacent phased antenna arrays 401, 402, 403, 404. When focusing on another subsector, for example subsector S3,1, the adjacent phased antenna arrays having reference number 303 and 404 co-act in order to obtain an enhanced beam intensity for scanning in the subsector S3,1. For said subsector S3,1 the phased antenna array having reference number 403 acts as primary phased antenna array 403 which excited a radiation beam directed in a predetermined direction along the azimuthal plane within subsector S3,1. Said radiation beam is enhanced by the radiation beam originating from the secondary phased antenna array having reference 404. As said, this interaction applies for all the phased antenna arrays 401, 402, 403, 404 and their adjacent phased antenna arrays 401, 402, 403, 404. The system 400 according to the present invention compensates for the scan losses as it can be seen in FIGS. 10*b* and 10*c*. FIGS. 10*b* and 10*c* show respectively the horizontal EIRP patterns (H-pol) and the vertical EIRP pattern (V-pol). These figures show the Effective Isotropic Radiated Power (EIRP in dBm) at the y-axis versus the azimuthal angle (in degrees). It can be seen in the graphs that the beam intensity observed at +45 and −45 degrees as seen from the boresight of each individual phased antenna array is significantly increased. The figures show in fact the four-faceted active dual-polarization for phased antenna arrays 401, 402, 403, 404 in square configuration. It can be seen that the H-polarization scan losses are compensated with an excess of 4.5 dB at +/− degrees scan angles from the panel boresights. Furthermore, along the individual panel boresights, the dual H-pol EIRP according to the present invention is 2.4 dB larger than the single EIRP according to the prior art. The EIRP enhancement is 6.02 dB for each polarization using coordinated phased antenna arrays rather than PAA's in stand-alone operation. It was experimentally found that this effect is valid for any number of antenna elements per phased antenna array.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. An antenna system for antenna beamforming, comprising:

at least three antenna panels, wherein each panel has a rear side and a front side, wherein the front side of each panel comprises at least one phased antenna array (PAA), wherein each phased antenna array comprises at least one array of antenna elements, wherein the at least three antenna panels are positioned such that each of the at least one phased antenna array enables coverage at least along all angular directions of the azimuthal plane;

one or more radio frequency (RF) beamforming networks, wherein each phased antenna array is connected to at least one of said one or more beamforming networks to adjust phase shifts associated with the antenna elements of said phased antenna array to generate an electromagnetic radiation beam; and at least one control unit connected to said one or more beamforming networks, wherein the control unit is at least configured to control one or more beamforming networks to cause a primary phased array of an antenna panel to generate a primary radiation beam in a first direction and to simultaneously cause a secondary phased antenna array of an adjacent panel to generate a secondary radiation beam in a second direction, wherein the first direction and the second direction have a same orientation such that a constructive superposition of electromagnetic fields of the primary and secondary beams is obtained.

2. The antenna system according to claim 1, wherein the control unit is configured to steer the direction of each panel array radiation beam.

3. The antenna system according to claim 1, wherein the control unit is configured to steer the beam width of each panel array radiation beam.

4. The antenna system according to claim 1, wherein the control unit is configured to control one or more beamforming networks to cause the primary phased array of the antenna panel to generate the primary radiation beam in the first direction and to simultaneously cause the secondary phased antenna array of the adjacent panel to generate the secondary radiation beam in the second direction, wherein the first direction and the second direction have the same orientation such that the constructive superposition of the electromagnetic fields of the primary and secondary beams is obtained, and such that power of the secondary beam is gradually adjusted.

5. The antenna system according to claim 1, wherein the control unit is configured to control one or more beamforming networks to cause a phased array of an antenna panel to generate a radiation beam in a moving direction from one side of the antenna panel to an opposing side of the antenna panel.

6. The antenna system according to claim 1, wherein the control unit is configured to control one or more beamforming networks to cause the primary phased array of the antenna panel to generate the primary radiation beam in the first direction and to simultaneously cause the secondary phased antenna array of the adjacent panel to generate the secondary radiation beam in the second direction, wherein the first direction and the second direction have the same orientation such that the constructive superposition of the electromagnetic fields of the primary and secondary beams is obtained, based upon the same orientation of said antenna panels and an operating frequency of the phased antenna arrays.

7. The antenna system according to claim 1, wherein the superposed electromagnetic waves of the primary beam and the secondary beam define a composite beam which extends in the first direction.

8. The antenna system according to claim 1, wherein the superposed electromagnetic waves of the primary beam and the secondary beam define a composite beam, wherein control unit is configured to generate a plurality of composite beams in different azimuthal directions, wherein the control unit is configured to successively generate different composite beams.

9. The antenna system according to claim 8, wherein the control unit is configured to alternately generate at least one composite beam and at least one boresight beam.

10. The antenna system according to claim 1, wherein the control unit is configured to control one or more beamforming networks to cause a phased array of an antenna panel to generate a boresight radiation beam in a direction perpendicular to a plane defined by said antenna panel.

11. The antenna system according to claim 1, wherein the number of antenna panels is equal to N, wherein N is an integer larger than or equal to 3 or 4, wherein the angle enclosed by the normal vectors to adjacent antenna panels is 360/N degrees.

12. The antenna system according to claim 11, wherein a primary angle enclosed by the normal of an antenna panel and said first direction is equal to Ω degrees, and wherein a secondary angle enclosed by the normal of an adjacent panel and said first direction is equal to ((360/N)−(Ω) degrees.

13. The antenna system according to claim 1, wherein the rear side of each panels faces the rear side of at least one other antenna panel.

14. The antenna system according to claim 1, wherein the antenna panels are positioned at a distance from each other, wherein a smallest distance is smaller than 15 millimetres.

15. The antenna system according to claim 1, wherein the control unit is configured to compute and/or measure a value of the phase shift between the primary beam and the secondary beam to realize a constructive superposition of the electromagnetic fields of the primary and secondary beams and/or wherein the control unit is configured to control one or more beamforming networks to cause each antenna element of at least one phased antenna array to generate electromagnetic waves mutually extending in substantially the same direction.

16. The antenna system according to claim 1, wherein each phased antenna array comprises at least one row of at least four antenna elements.

17. The antenna system according to claim 1, wherein a plane defined by each phased antenna array is a vertical plane.

18. The antenna system according to claim 1, wherein the antenna system is configured to generate beams collectively covering the full azimuthal plane.

19. Antenna system according to claim 1, wherein the antenna system is configured as base station, repeater, router, and/or access point.

20. Method for operating an antenna system according to claim 1, wherein the control unit is activated to control one or more beamforming networks to cause a primary phased array of an antenna panel to generate a primary radiation beam in a first direction and to simultaneously cause a secondary phased antenna array of an adjacent panel to generate a secondary radiation beam in a second direction, wherein the first direction equals the second direction such that a constructive superposition of the electromagnetic fields of the primary and secondary beams is obtained.

* * * * *